United States Patent
Tomeba et al.

(10) Patent No.: US 12,016,005 B2
(45) Date of Patent: Jun. 18, 2024

(54) TERMINAL DEVICE, AND COMMUNICATION METHOD FOR SOUNDING REFERENCE SIGNAL TRANSMISSION USING SPATIAL DOMAIN FILTER SETTINGS

(71) Applicants: SHARP KABUSHIKI KAISHA, Sakai (JP); FG Innovation Company Limited, Tuen Mun (HK)

(72) Inventors: Hiromichi Tomeba, Sakai (JP); Ryota Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 514 days.

(21) Appl. No.: 17/275,161

(22) PCT Filed: Sep. 6, 2019

(86) PCT No.: PCT/JP2019/035162
§ 371 (c)(1),
(2) Date: Mar. 10, 2021

(87) PCT Pub. No.: WO2020/054607
PCT Pub. Date: Mar. 19, 2020

(65) Prior Publication Data
US 2022/0201672 A1    Jun. 23, 2022

(30) Foreign Application Priority Data
Sep. 14, 2018   (JP) .................................. 2018-172521

(51) Int. Cl.
*H04W 72/044*   (2023.01)
*H04B 7/0456*   (2017.01)
(Continued)

(52) U.S. Cl.
CPC ......... *H04W 72/046* (2013.01); *H04L 5/0053* (2013.01)

(58) Field of Classification Search
CPC . H04W 72/04; H04W 72/044; H04W 72/046; H04L 5/003; H04L 5/0053
See application file for complete search history.

(56) References Cited

U.S. PATENT DOCUMENTS 10,516,514 B2 * 12/2019 Park ..................... H04B 7/0404
11,121,897 B2 *  9/2021 Xiong ................. H04L 27/2613
(Continued)

FOREIGN PATENT DOCUMENTS

| CN | 108024365 A | 5/2018 |
| CN | 108134659 A | 6/2018 |

(Continued)

OTHER PUBLICATIONS

Huawei et al., "Remaining issue for beam 1-7 management" [online], 3GPP TSG RAN WG1 # 926, R1-1803636.
(Continued)

*Primary Examiner* — Jenee Holland
(74) *Attorney, Agent, or Firm* — ScienBiziP, P.C.

(57) ABSTRACT

A terminal device and a communication method are provided. The terminal device includes a receiver for receiving sounding reference signal (SRS) setting information and setting information for signals having a spatial correlation set to a SRS, and a transmitter for transmitting the SRS. The SRS setting information includes information indicating the spatial correlation to the SRS. The receiver, when receiving the signals having the spatial correlation set to the SRS, sets a first spatial domain reception filter and a second spatial domain reception filter. The transmitter, when transmitting the SRS, sets a first spatial domain transmission filter and a second spatial domain transmission filter. The first spatial (Continued)

domain reception filter and the first spatial domain transmission filter are set with beam correspondence. The second spatial domain reception filter and the second spatial domain transmission filter are set with beam correspondence.

10 Claims, 5 Drawing Sheets

(51) Int. Cl.
*H04B 7/06* (2006.01)
*H04L 5/00* (2006.01)
*H04W 16/28* (2009.01)

(56) References Cited

U.S. PATENT DOCUMENTS

| | | | |
|---|---|---|---|
| 2018/0206132 A1 | 7/2018 | Guo et al. | |
| 2018/0227035 A1* | 8/2018 | Cheng | H04B 7/0626 |
| 2018/0234959 A1 | 8/2018 | Ahn et al. | |
| 2018/0358688 A1* | 12/2018 | Yue | H04W 72/21 |
| 2019/0149299 A1* | 5/2019 | Lee | H04L 5/0092 370/329 |
| 2019/0199496 A1 | 6/2019 | Qin et al. | |
| 2019/0281588 A1* | 9/2019 | Zhang | H04B 7/0404 |
| 2019/0349867 A1* | 11/2019 | MolavianJazi | H04W 52/40 |
| 2019/0349964 A1* | 11/2019 | Liou | H04W 76/27 |
| 2019/0373592 A1* | 12/2019 | Ji | H04B 7/022 |
| 2020/0053724 A1* | 2/2020 | MolavianJazi | H04W 72/044 |
| 2020/0053775 A1* | 2/2020 | Lee | H04W 74/0808 |
| 2020/0106559 A1* | 4/2020 | Vilaipornsawai | H04W 72/23 |
| 2020/0178280 A1* | 6/2020 | Guan | H04L 5/0048 |
| 2020/0213053 A1* | 7/2020 | Faxér | H04L 5/0023 |
| 2020/0322893 A1 | 10/2020 | Yao et al. | |
| 2021/0021389 A1* | 1/2021 | Hoshino | H04L 5/0051 |
| 2021/0021392 A1* | 1/2021 | Hoshino | H04L 5/0048 |
| 2021/0022128 A1* | 1/2021 | Chen | H04W 72/046 |
| 2021/0022210 A1* | 1/2021 | Hoshino | H04L 5/0016 |
| 2021/0029555 A1* | 1/2021 | Zhou | H04B 7/0456 |
| 2021/0058910 A1* | 2/2021 | Yokomakura | H04L 5/0048 |
| 2021/0135821 A1* | 5/2021 | Guan | H04B 7/088 |
| 2021/0152397 A1* | 5/2021 | Jiang | H04L 5/0048 |
| 2021/0159966 A1* | 5/2021 | Xi | H04B 7/088 |
| 2021/0184819 A1* | 6/2021 | Takeda | H04W 24/10 |
| 2021/0282167 A1* | 9/2021 | Wang | H04L 5/0044 |
| 2023/0064325 A1* | 3/2023 | Määttänen | H04B 7/0617 |

FOREIGN PATENT DOCUMENTS

| | | |
|---|---|---|
| WO | 2018028510 A1 | 2/2018 |
| WO | 2018127181 A1 | 7/2018 |

OTHER PUBLICATIONS

Nokia et al., "On Spatial Relation between UL and 1-7DL Beams" [online], 3GPP TSG RAN WG1 #93, R1-1807194.
Huawei et al., "Discussion on panel-based UL beam 1-7selection" [online], 3GPP TSG RAN WG1 #94, R1-1809122.
Ericsson, "Interim draft TS38331 v15.2.0" 1-7[online], 3GPP TSG RAN WG2 #102, R2-1809240.
CMCC, "Enhancements on multi-beam operation" 1-7[online], 3GPP TSG RAN WG1 adhoc_NR_AH_1901, R1-1900419.
Nokia et al., "Enhancements on Multi-beam 1-7Operation" [online], 3GPP TSG RAN WG1 #95 R1-1813490.
Massive MIMO for Next Generation Wireless Systems, Erik G. Larsson, ISY, Linkoping University, Sweden Ove Edfors and Fredrik Tufvesson, Lund University, Sweden Thomas L. Marzetta, Bell Labs, Alcatel-Lucent, United States, Accepted From Open Call (Feb. 2014).
Samsung, WI Proposal on NR MIMO Enhancements, 3GPP TSG RAN Meeting #80, La Jolla, USA, Jun. 11-14, 2018, RP-181453.
IMT Vision—Framework and overall objectives of the future development of IMT for 2020 and beyond, M Series Mobile, radiodetermination, amateur and related satellite services, Recommendation ITU-R M.2083-0 (Sep. 2015).

* cited by examiner

TERMINAL DEVICE, AND COMMUNICATION METHOD FOR SOUNDING REFERENCE SIGNAL TRANSMISSION USING SPATIAL DOMAIN FILTER SETTINGS

CROSS-REFERENCE TO RELATED APPLICATION(S)

This application is a national stage application of International Patent Application PCT/JP2019/035162, filed Sep. 6, 2019, now published as WO/2020/054607. International Patent Application PCT/JP2019/035162 claims the benefit of JP Patent Application 2018-172521, filed Sep. 14, 2018. JP Patent Application 2018-172521 and International Patent Application PCT/JP2019/035162, now published as WO/2020/054607, are incorporated herein by reference.

FIELD

The present disclosure relates to a base station device, a terminal device and a communication method.

BACKGROUND

With the aim to commence commercial services around 2020, research and development activities related to the fifth generation mobile radio communication system (the 5G system) have been actively conducted. Recently, the International Telecommunication Union Radio Communications Sector (ITU-R), an international standardization organization, has issued a vision recommendation on the standard scheme of 5G systems (International mobile telecommunication-2020 and beyond: IMT-2020) (referring to Non-Patent Literature 1).

Based on communication systems responding to the rapid increase in data service, ensuring frequency resources is becoming an important task. Therefore, one of the objectives of 5G is to realize ultra-large-capacity communication using a higher frequency band than a frequency band used in the Long Term Evolution (LTE).

However, in radio communications using high frequency bands, channel loss becomes an issue. In order to compensate for channel loss, beamforming using a large number of antennas is becoming a promising technique (referring to Non-Patent Literature 2). Furthermore, it has also been considered to provide a plurality of antennas (antenna panels) that are set with independent beamforming, and compensate for channel loss by appropriately switching the antennas (referring to Non-Patent Literature 3).

PRIOR ART DOCUMENTS

Non-Patent Literature

Non-Patent Literature 1: "IMT Vision-Framework and overall objectives of the future development of IMT for 2020 and beyond," Recommendation ITU-R M. 2083-0, September 2015.

Non-Patent Literature 2: E. G. Larsson, O. Edfors, F. Tufvesson, and T. L. Marzetta, "Massive MIMO for next generation wireless system," IEEE Commun. Mag., vol. 52, no.2, pp. 186-195, February 2014.

Non-Patent Literature 3: 3GPP RP-181453, "Enhancement on MIMO for NR," June 2018.

SUMMARY

Problems to be Addressed

However, there exists the following problem: when a base station device having a plurality of antenna panels and a terminal device perform beamforming transmission, if either or both devices cannot correctly recognize which of the antenna panels is now being considered, the beam sweep cannot be performed correctly.

An aspect of the present disclosure is implemented in this circumstance, with the objective to provide a base station device, a terminal device and a communication method, wherein the base station device having a plurality of antenna panels and the terminal device perform beam sweeping and beamforming with high precision, and, thereby, increases the frequency usage efficiency or throughput.

Technology Aspects

For addressing the above problems, an aspect of a base station device, a terminal device and a communication method of the present disclosure is provided with the following details.

(1) An aspect of a terminal device of the present disclosure is a terminal device that communicates with a base station device, the terminal device comprising: a receiver for receiving sounding reference signal (SRS) setting information and setting information for signals having a spatial correlation set to at least one SRS; and a transmitter for transmitting the at least one SRS, the SRS setting information includes information indicating the spatial correlation to the at least one SRS, the receiver, when receiving the signals having the spatial correlation set to the at least one SRS, sets a first spatial domain reception filter and a second spatial domain reception filter; the transmitter, when transmitting the at least one SRS, sets a first spatial domain transmission filter and a second spatial domain transmission filter; the first spatial domain reception filter and the first spatial domain transmission filter are set with beam correspondence; the second spatial domain reception filter and the second spatial domain transmission filter are set with beam correspondence; the setting information for the signals having the spatial correlation set to the at least one SRS includes information identifying the first spatial domain reception filter and the second spatial domain reception filter; the transmitter transmits the at least one SRS using at least one of the first spatial domain transmission filter and the second spatial domain transmission filter based on the information indicating the spatial correlation to the at least one SRS and the signals having the spatial correlation set to the at least one SRS.

(2) Additionally, an aspect of a terminal device of the present disclosure is a terminal device as described in (1), wherein the first spatial domain reception filter is associated with a predetermined transmission configuration indication (TCI)-State.

(3) Additionally, an aspect of a terminal device of the present disclosure is a terminal device as described in (1), wherein information identifying the first spatial domain reception filter and the second spatial domain reception filter is set in a predetermined frequency band.

(4) Additionally, an aspect of a terminal device of the present disclosure is a terminal device as described in (1), wherein the SRS setting information includes the information identifying the first spatial domain reception filter and the second spatial domain reception filter.

(5) Additionally, an aspect of a terminal device of the present disclosure is a terminal device as described in (1), wherein each of the signals having the spatial correlation set to the at least one SRS is a synchronization signal (SS)/Physical Broadcast Channel (PBCH) signal, a filter that is set when receiving each SS/PBCH signal is set as the first spatial domain reception filter.

(6) Additionally, an aspect of a communication method of the present disclosure is a communication method for a terminal device communicating with a base station device, the communication method comprising: receiving SRS setting information and setting information for signals having a spatial correlation set to at least one SRS; and transmitting the at least one SRS, the SRS setting information includes information indicating the spatial correlation to the at least one SRS; when receiving the signals having the spatial correlation set to the at least one SRS, setting a first spatial domain reception filter and a second spatial domain reception filter; when transmitting the at least one SRS, setting a first spatial domain transmission filter and a second spatial domain transmission filter; the first spatial domain reception filter and the first spatial domain transmission filter are set with beam correspondence; the second spatial domain reception filter and the second spatial domain transmission filter are set with beam correspondence; the setting information for the signals having the spatial correlation set to the at least one SRS includes information identifying the first spatial domain reception filter and the second spatial domain reception filter; the at least one SRS is transmitted using at least one of the first spatial domain transmission filter and the second spatial domain transmission filter based on the information indicating the spatial correlation to the at least one SRS and the signals having the spatial correlation set to the at least one SRS.

(7) Additionally, an aspect of a communication method of the present disclosure is a communication method as described in (6), wherein the first spatial domain reception filter is associated with a predetermined TCI-State.

(8) Additionally, an aspect of a communication method of the present disclosure is a communication method as described in (6), wherein information identifying the first spatial domain reception filter and the second spatial domain reception filter is set in a predetermined frequency band.

(9) Additionally, an aspect of a communication method of the present disclosure is a communication method as described in (6), wherein the SRS setting information includes the information identifying the first spatial domain reception filter and the second spatial domain reception filter.

(10) Additionally, an aspect of a communication method of the present disclosure is a communication method as described in (6), wherein each of the signals having the spatial correlation set to the at least one SRS is a SS/PBCH signal, a filter that is set when receiving each SS/PBCH signal is set as the first spatial domain reception filter.

(11) Additionally, an aspect of a communication method of the present disclosure is a communication method for a terminal device communicating with a network, the communication method comprising: receiving downlink control information (DCI) from the network, the DCI scheduling a Physical Uplink Shared Channel (PUSCH) and including one or more sounding reference signal resource indicators (SRIs); and transmitting the PUSCH to one or more transmission reception points (TRPs), the one or more SRIs used to derive one or more spatial relations corresponding to the one or more TRPs, and same uplink (UL) data is transmitted to the one or more TRPs.

(12) Additionally, an aspect of a communication method of the present disclosure is a communication method as described in (11), wherein the one or more SRIs indicate one or more sounding reference signal (SRS) resources.

Effects

According to an aspect of the present disclosure, the base station device having a plurality of antenna panels and the terminal device perform beam sweeping and beamforming with high precision, and, thereby, increases the frequency usage efficiency or throughput.

DESCRIPTION

The communication system according to the present implementation includes: a base station device (a transmission device, a cell, a transmission point, a transmission antenna group, a transmission antenna port group, a component carrier, an eNodeB, a transmission point, a transceiver point, a transmission panel, an access point) and a terminal device (a terminal, a mobile terminal, a reception point, a reception terminal, a reception device, a reception antenna group, a reception antenna port group, user equipment UE, a reception point, a reception panel, a station). Additionally, a base station device connected to a terminal device (for establishing a radio link) is called a serving cell.

The base station device and the terminal device in the present implementation are also generally referred to as a communications device. In the present implementation, at least a part of the communication method performed by the base station device can also be performed by the terminal device. Similarly, in the present implementation, at least a part of the communication method performed by the terminal device can also be performed by the base station device.

The base station device and the terminal device according to the present implementation may communicate in a frequency band that requires permission (license band) and/or communicate in a frequency band that does not require permission (unlicensed band).

In the present implementation, "X/Y" includes the meaning of "X or Y." In the present implementation, "X/Y" includes the meaning of "X and Y." In the present implementation, "X/Y" includes the meaning of "X and/or Y."

1. First Implementation

Figure 1:
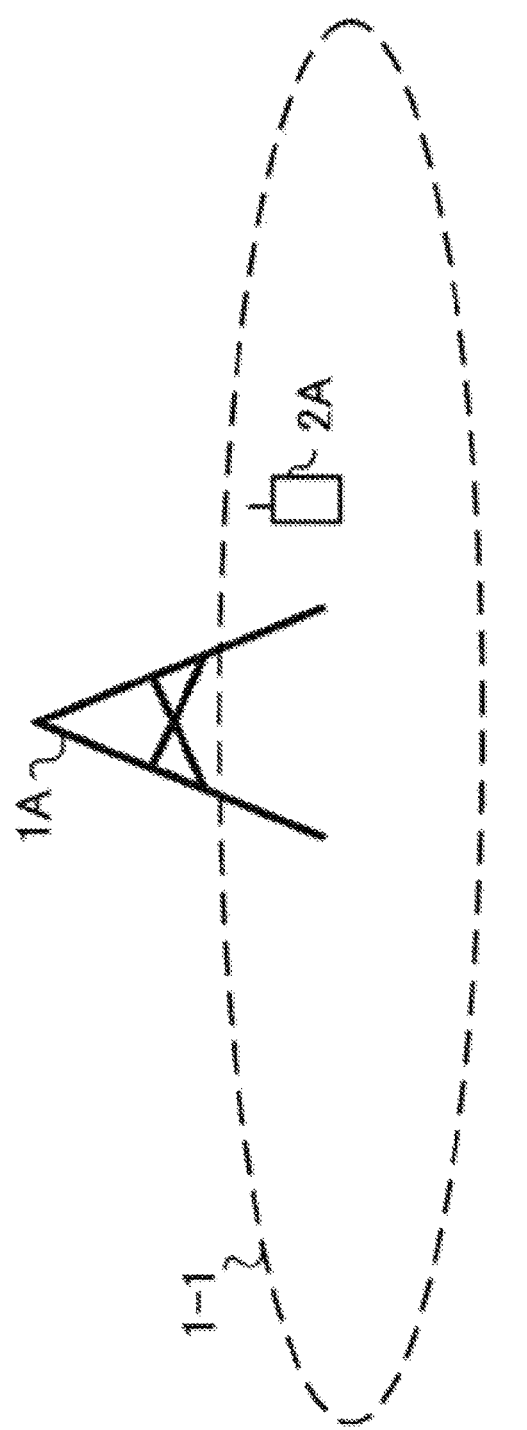
FIG. 1 is a schematic diagram of a communication system according to an aspect of the present disclosure.

FIG. 1 is a schematic diagram of a communication system according to an aspect of the present disclosure. As illustrated in FIG. 1, the communication system according to the present implementation includes a base station device 1A and a terminal device 2A. Furthermore, a coverage area 1-1 is an area (communication area) where the base station device 1A can be connected to the terminal device. Additionally, the base station device 1A may be referred to as a base station device. The terminal device 2A may also be referred to as a terminal device.

In FIG. 1, the following uplink physical channel may be used in the uplink radio communication from the terminal device 2A to the base station device 1A. The uplink physical channels are used for transmitting information output from higher layers.

PUCCH (Physical Uplink Control Channel)
PUSCH (Physical Uplink Shared Channel)
PRACH (Physical Random Access Channel)

PUCCH may be used for transmitting uplink control information (UCI). Herein, the UCI may include a positive acknowledgement (ACK) for downlink data (downlink transport block, Downlink-Shared Channel, DL-SCH), or a negative acknowledgement (NACK), in short, ACK/NACK. The ACK/NACK for downlink data may be referred to as HARQ-ACK, or HARQ feedback.

Furthermore, the UCI may include channel state information (CSI) for downlink. Moreover, the UCI may include a scheduling request (SR) for requesting resources of uplink-shared channel (UL-SCH). The CSI may be equivalent to: a rank indicator (RI) for specifying a preferable spatial multiplexing number, a precoding matrix indicator (PMI) for specifying a preferable precoder, a channel quality indicator (CQI) for specifying a preferable transmission rage, a CSI resource signal (CSI-RS) resource indicator (CRI) for specifying preferable CSI-RS resources, a RSRP (Reference Signal Received Power) measured by CSRI-RS or SS (Synchronization Signal), etc.

The CQI (herein referred to as CQI value) may be set as a preferred modulation scheme (for example, QPSK, 16 QAM, 64 QAM, 256 QAM, etc.) and a coding rate in a predetermined band (details are subsequently provided). The CQI value may be set as an index (CQI Index) determined by the modulation scheme and the coding rate. The CQI value may be predetermined by the system.

The CRI refers to a CSI-RS resource from a plurality of CSI-RS resources with preferred received power/received quality.

It is noted that the RI and the PMI may be predetermined by the system. The RI and the PMI may be set as indices for determining spatial multiplexing number or precoding matrix information. It is further noted that part or all of the CQI value, PMI value, RI value and CRI value may be referred to as CSI value.

PUSCH may be used in transmitting uplink data (uplink transport block, UL-SCH). Furthermore, PUSCH may also be used for transmitting ACK/NACK and/or the CSI with uplink data. Furthermore, PUSCH may also be used for transmitting only the UCI.

Additionally, PUSCH may be used to transmit RRC message. The RRC message is the information/signal proceed in the radio resource control (RRC) layer. Furthermore, PUSCH may be used to transmit MAC control element (CE). Herein, the MAC CE is the information/signal processed in the medium access control (MAC) layer.

For example, power headroom may be included in the MAC CE and reported via PUSCH. This means that, the fields of MAC CE may also be used to indicate a level of power headroom.

PRACH may be used to transmit a random access preamble.

Furthermore, in uplink radio communication, the uplink reference signal (UL RS) may be used as an uplink physical signal. The uplink physical signal may not be used for transmitting information output from a higher layer, but is used by the physical layer. Herein, the uplink reference signal may include a demodulation reference signal (DMRS), a sounding reference signal (SRS), and a phase-tracking reference signal (PT-RS).

The DMRS may be related to the transmission of PUSCH or PUCCH. For example, the base station device 1A uses the DMRS to perform transmission path correction of PUSCH or PUCCH. For example, the base station device 1A uses the SRS to determine an uplink channel state. Furthermore, the SRS may be used for uplink observation (sounding). Furthermore, the PT-RS may be used to compensate for phase noise. It is noted that the DMRS of uplink may also be referred to as an uplink DMRS.

In FIG. 1, the following downlink physical channel may be used in the uplink radio communication from the base station device 1A to the terminal device 2A. The downlink physical channels are used for transmitting information output from higher layers.

PBCH (Physical Broadcast Channel)
PCFICH (Physical Control Format Indicator Channel)
PHICH (Physical Hybrid automatic repeat request Indicator Channel; HARQ Indicator Channel)
PDCCH (Physical Downlink Control Channel)
EPDCCH (Enhanced Physical Downlink Control Channel)
PDSCH (Physical Downlink Shared Channel PBCH may be used to broadcast a master information block (MIB, Broadcast Channel: BCH) universally used by the terminal devices. PCFICH may be used to transmit information indicating areas used for PDCCH transmission (for example, the number of orthogonal frequency division multiplexing (OFDM) symbols). It is noted that the MIB may be referred to as the minimum system information.

PHICH may be used to transmit ACK/NACK for uplink data (transport block, codeword) that is received by the base station device 1A. That is, PHICH is used to transmit a HARQ indicator (HARQ feedback) indicating ACK/NACK for uplink data. Additionally, ACK/NACK may be referred to as HARQ-ACK. The terminal device 2A notifies the higher layer of the received ACK/NACK. The ACK/NACK may include ACK indicating that the data has been correctly received, NACK indicating that the data has not been correctly received, and DTX indicating that there was no corresponding data. Furthermore, if there is no PHICH for the uplink data, the terminal device 2A notifies the higher layer with an ACK.

PDCCH and EPDCCH may be used to transmit downlink control information (DCI). Herein, various types of DCI format are defined for transmission of downlink control information. That is, the field for the downlink control information is defined as the DCI format and mapped to information bits.

For example, DCI format 1A may be defined for scheduling a PDSCH (transmission of one downlink transport block) in a cell as the DCI format of the downlink.

For example, the DCI format for the downlink includes: information relating to PDSCH resource assignment, information relating to modulation and coding scheme (MCS) for PDSCH, and downlink control information such as a TPC command for PUCCH. Herein, the DCI format for the downlink may be referred to as a downlink grant (or downlink assignment).

Furthermore, for example, DCI format 0 may be defined for scheduling a PUSCH (transmission of one uplink transport block) in a cell as the DCI format for the uplink.

For example, the DCI format for the uplink includes: information relating to PUSCH resource assignment, information relating to MCS for PUSCH, and uplink control information such as a TPC command for PUSCH. The DCI format for the uplink may be referred to as an uplink grant (or uplink assignment).

Additionally, the DCI format for the uplink may be used to request downlink channel state information (CSI; also be referred to as received quality information).

Moreover, the DCI format for the uplink may be used to indicate the setting of the uplink resource that maps the channel state information report (CSI feedback report), which the terminal device feeds back to the base station device. For example, the CSI feedback report may be used to indicate periodical reporting of an uplink resource setting of the channel state information (Periodic CSI). The CSI feedback report may be used to periodically report a mode setting of the channel state information (CSI report mode).

For example, the CSI feedback report may be used to indicate non-periodical reporting of an uplink resource setting of the channel state information (Aperiodic CSI). The CSI feedback report may be used to non-periodically report a mode setting of the channel state information (CSI report mode).

For example, the CSI feedback report may be used to indicate semi-persistent reporting of an uplink resource setting of the channel state information (Semi-persistent CSI). The CSI feedback report may be used to semi-persistently report a mode setting of the channel state information (CSI report mode). The semi-persistent CSI report is a CSI report that is periodically performed using a higher layer signal or downlink control information during a period after activation to deactivation.

Furthermore, the DCI format for the uplink may be used to indicate a setting for the type of CSI feedback report that the terminal device feeds back to the base station device. The types of the CSI feedback report include a wideband CSI (for example, Wideband CQI), a narrowband CSI (for example, Subband CQI) and others.

When the PDSCH resource is scheduled using the downlink assignment, the terminal device receives the downlink data on the scheduled PDSCH. Furthermore, when a PUSCH resource is scheduled using an uplink grant, the terminal device transmits uplink data and/or uplink control information on the scheduled PUSCH.

PDSCH may be used for transmitting downlink data (downlink transport block, DL-SCH). The PDSCH is used for transmitting a system information block type 1 message. The system information block type 1 message is cell-specific (cell-specific) information.

Furthermore, PDSCH may be used for transmitting a system information message. The system information message includes a system information block X other than the system information block type 1. The system information message is cell-specific (cell-specific) information.

Furthermore, PDSCH may be used for transmitting an RRC message. Herein, the RRC message transmitted from the base station device may be universal to a plurality of terminal devices in the cell. Furthermore, the RRC message transmitted from the base station device 1A may be a message dedicated to a terminal device 2A (also referred to as dedicated signaling). That is, using the message dedicated to a terminal device to transmit user device-specific (user device-specific) information. Furthermore, PDSCH may be used for transmitting MAC CE.

Herein, the RRC message and/or the MAC CE may be referred to as higher layer signaling.

Furthermore, the PDSCH may be used to request downlink channel state information. Furthermore, the PDSCH may be used to transmit an uplink resource that maps a channel state information report (CSI feedback report) that the terminal device feeds back to the base station device. For example, the CSI feedback report may be used to indicate periodical reporting of an uplink resource setting of the channel state information (Periodic CSI). The CSI feedback report may be used to periodically report a mode setting of the channel state information (CSI report mode).

The types of downlink channel state information reports may include broadband CSI (for example, Wideband CSI), narrowband CSI (for example, Subband CSI) and others. Broadband CSI calculates channel state information for a system band of a cell. The narrowband CSI divides a system band into predetermined units, and calculates channel state information for the division.

In downlink radio communication, a synchronization signal (SS) and a downlink reference signal (DL RS) may be used as downlink physical signals. The downlink physical signal may not be used for transmitting information output from the higher layer, but used by the physical layer. It is noted that the synchronization signal may include a primary synchronization signal (PSS) and a secondary synchronization signal (SSS).

The synchronization signal may be used by the terminal device to synchronize the downlink frequency domain and the time domain. The synchronization signal may be used to measure received power, received quality, or a signal-to-interference and noise power ratio (SINR). It is noted that the received power measured with the synchronization signal may be referred to as synchronization signal-reference signal received power (SS-RSRP), the received quality measured with the synchronization signal may be referred to as reference signal received quality (SS-RSRQ), and the SINR measured with the synchronization signal may be referred to as SS-RSRP. It is noted that note that SS-RSRQ is the ratio of SS-RSRP to RSSI. Received signal strength indicator (RSSI) is the average of the total received power in an observing period. Additionally, the synchronization signal/downlink reference signal may be used by the terminal device to perform channel correction of the downlink physical channel. For example, the synchronization signal/downlink reference signal is used by the terminal device to calculate downlink channel state information.

Herein, the downlink reference signal includes demodulation reference signal (DMRS), non-zero power channel state information-reference signal (NZP CSI-RS), zero power channel state information-reference signal (ZP CSI-RS), PT-RS, tracking reference signal (TRS). It is noted that the DMRS for downlink may be referred to as a downlink DMRS. It is noted that, in the subsequent implementations, when only CSI-RS is referred, it includes NZP CSI-RS and/or ZP CSI-RS.

The DMRS may be transmitted in the subframe and the band used for transmitting the PDSCH/PBCH/PDCCH/EPDCCH associated with the DMRS, and may be used for demodulating the PDSCH/PBCH/PDCCH/EPDCCH associated with the DMRS.

The resources of NZP CSI-RS may be set by the base station device 1A. For example, the terminal device 2A performs signal measurement (channel measurement) or interference measurement using NZP CSI-RS. Furthermore, the NZP CSI-RS may be used for beam scan that searches for a preferable beam direction, beam recovery for recovering when received power/received quality in the beam direction is deteriorated, and others alike. The ZP CSI-RS resources may be set by the base station device 1A. Base station device 1A transmits ZP CSI-RS with zero output. For example, the terminal device 2A measures the interference in the resources corresponding to the ZP CSI-RS. The resource for interference measurement corresponding to ZP CSI-RS may also be referred to as CSI-IM (Interference Measurement) resource.

The base station device 1A transmits (sets) NZP CSI-RS resource settings for NZP CSI-RS resources. The NZP CSI-RS resource settings includes one or more NZP CSI-RS resource mappings, CSI-RS resource setting ID of each NZP CSI-RS resource, and a part or all of the number of antenna ports. The CSI-RS resource mapping is information (for example, resource element) indicating an OFDM symbol and a subcarrier in the slot assigned with the CSI-RS resource. The CSI-RS resource setting ID is used to determine an NZP CSI-RS resource.

The base station device 1A transmits (sets) CSI-IM resource settings. The CSI-IM resource settings includes one or more CSI-IM resource mappings and CSI-IM resource configuration ID for each CSI-IM resource. The CSI-IM resource mapping is information (for example, a resource element) indicating an OFDM symbol and a subcarrier in the slot assigned with the CSI-IM resource. The CSI-IM resource setting ID is used to determine a CSI-IM setting resource.

Additionally, CSI-RS may be used for measuring received power, received quality, or SINR. The received power measured by CSI-RS may be referred to as CSI-RSRP, the received quality measured by CSI-RS may be referred to as CSI-RSRQ, and the SINR measured by CSI-RS may be referred to as CSI-SINR. It is noted that CSI-RSRQ is a ratio of CSI-RSRP and RSSI.

Additionally, the CSI-RS may be transmitted periodically/aperiodically/semi-persistently.

Regarding the CSI, a terminal device is set in a higher layer. For example, there are a report setting as a CSI report setting, a resource setting as a resource setting for measuring CSI, and a measurement-related setting for relating the report setting and the resource setting for CSI measurement. Additionally, there are one or more report settings, resource settings, and measurement-related settings.

Report settings include a part or all of report setting ID, report setting type, codebook setting, CSI report quantity, CQI table, beam reporting based on group, number of CQI of each report, and number of CQI of each low order report. The report setting ID is used to determine a report setting. The report setting type indicates a periodic/aperiodic/semi-persistent CSI report. The CSI report quantity indicates the quantity (value, type) of the report, for example, a part or all of CRI, RI, PMI, CQI, or RSRP. The CQI table indicates the CQI table when calculating the CQI. The beam reporting based on group is set with ON/OFF (valid/invalid). The number of CQI of each report indicates the maximum number of CSI of each CSI report. It may indicate the maximum number of CQIs of each report when the RI is 4 or less. The number of CQIs of each report in the low order may be applied when the number of CQIs of each report is 2. Additionally, the codebook setting includes a codebook type and a setting of the codebook. The codebook type indicates a type 1 codebook or a type 2 codebook. Additionally, the codebook setting includes setting of a type 1 codebook or a type 2 codebook.

The resource setting includes a part or all of a resource setting ID, a synchronization signal block resource measurement list, a resource setting type, and one or more resource set settings. The resource setting ID is used to determine a resource setting. The synchronization signal block resource setting list is a list of resources performing measurement using synchronization signal. The resource setting type indicates the CSI-RS is transmitted periodically, aperiodically or semi-persistently. When in a setting of transmitting the CSI-RS semi-persistently, the CSI-RS is transmitted periodically using a higher layer signal or downlink control information during a period after activation to deactivation.

The resource set setting includes a part or all of a resource set setting ID, resource repetition, and information indicating one or more CSI-RS resources. The resource set setting ID is used to determine the resource set setting. The resource repetition indicates an ON/OFF of the resource repetition in the resource set. When the resource repetition is ON, it means that the base station device uses a fixed (the same one) transmission beam for each of a plurality of CSI-RS resources in the resource set. In other words, when the resource repetition is ON, the terminal device assumes that the base station device uses a fixed (the same one) transmission beam for each of the plurality of CSI-RS resources in the resource set. When the resource repetition is OFF, it means that the base station device does not use a fixed (the same one) transmission beam in each of the plurality of CSI-RS resources in the resource set. In other words, when the resource repetition is OFF, the terminal device assumes that the base station device does not use a fixed (the same one) transmission beam in each of the plurality of CSI-RS resources in the resource set. The information indicating the CSI-RS resource includes one or more CSI-RS resource setting IDs, and one or more CSI-IM resource setting IDs.

The measurement-related setting includes a part or all of the measurement-related setting ID, the report setting ID, and the resource setting ID, wherein the report setting and the resource setting are related. The measurement-related setting ID is used to determine the measurement-related setting.

The multimedia broadcast multicast service single frequency network (MBSFN) RS may be transmitted in the entire band of the subframe used for transmitting the PMCH. The MBSFN RS may be used for demodulating PMCH. The PMCH is transmitted on an antenna port used for transmitting the MBSFN RS.

Herein, the downlink physical channel and the downlink physical signal may be collectively referred to as a downlink signal. Additionally, the uplink physical channel and the uplink physical signal may be collectively referred to as an uplink signal. Furthermore, the downlink physical channel and the uplink physical channel may be collectively referred to as a physical channel. Furthermore, the downlink physical signal and the uplink physical signal may be collectively referred to as a physical signal.

Furthermore, BCH, UL-SCH and DL-SCH are transport channels. The channels used in the MAC layer are referred to as transport channels. Furthermore, the unit of the transport channel used in the MAC layer is referred to as a transport block (TB) or a MAC protocol data unit (PDU). The transport block is a unit of data that the MAC layer delivers to the physical layer. In the physical layer, transport blocks are mapped to codewords, and each codeword is coded or processed accordingly.

Furthermore, for a terminal device that supports carrier aggregation (CA), the base station device may communicate by integrating a plurality of component carriers (CCs) to thereby perform wider band transmission. In the carrier aggregation, one primary cell (PCell) and one or more secondary cells (SCell) may be set as a set of serving cells.

Furthermore, in dual connectivity (DC), a master cell group (MCG) and a secondary cell group (SCG) may be set as serving cell groups. The MCG includes a PCell and, optionally, one or more SCells. The SCG includes a primary SCell (PSCell) and, optionally, one or more SCells.

The base station device may communicate using a radio frame. The radio frame is composed of a plurality of subframes (sub-intervals). When expressing the frame length in time, for example, the radio frame length may be set to 10 milliseconds (ms) and the subframe length may be set to 1 ms. In this example, the radio frame is composed of ten subframes.

Furthermore, each slot is composed of 14 OFDM symbols. Since the OFDM symbol length may change according to the subcarrier spacing, therefore, the slot length may be substituted by the subcarrier spacing. Furthermore, a mini-slot is composed of OFDM symbols that is fewer than slot. A slot/mini-slot may be a scheduling unit. It is noted that the terminal device may know the slot-based scheduling/mini-slot-based scheduling based on the position (configuration) of the first downlink DMRS. In slot-based scheduling, the first downlink DMRS is configured in the third or fourth symbol of a slot. In the mini-slot-based scheduling, the first downlink DMRS is configured in the first symbol of the scheduled data (resources, PDSCH).

Furthermore, a resource block may be defined by 12 consecutive subcarriers. Furthermore, a resource element may be defined by a frequency domain index (for example, a subcarrier index) and a time domain index (for example, an OFDM symbol index). Resource elements may be classified as uplink resource elements, downlink elements, flexible resource elements, and reserved resource elements. In the reserved resource element, the terminal device does not transmit an uplink signal and does not receive a downlink signal.

Also, multiple subcarrier spacing (SCS) is supported. For example, the SCS may be 15/30/60/120/240/480 kHz.

The base station device/terminal device may communicate in a licensed band or an unlicensed band. The base station device/terminal device may communicate via at least one SCell that operates in the unlicensed band with carrier aggregation and the license band being PCell. Furthermore, the base station device/terminal device may perform dual connectivity that the master cell group communicates on the license band and the secondary cell group communicates on the unlicensed band. Furthermore, the base station device/terminal device may communicate only with the PCell in the unlicensed band. Furthermore, the base station device/terminal device may communicate with CA or DC only in the unlicensed band. It is noted that a situation may be referred to as licensed-assisted access (LAA) when the licensed band is a PCell and the cells of the unlicensed band (SCell, PSCell) are assisted and communicated by, for example, CA or DC. Furthermore, the communication between the base station device and the terminal device using only the unlicensed band may be referred to as unlicensed-standalone access (ULSA). Furthermore, the communication between the base station device and the terminal device using only the license band may be referred to as licensed access (LA).

Figure 2:
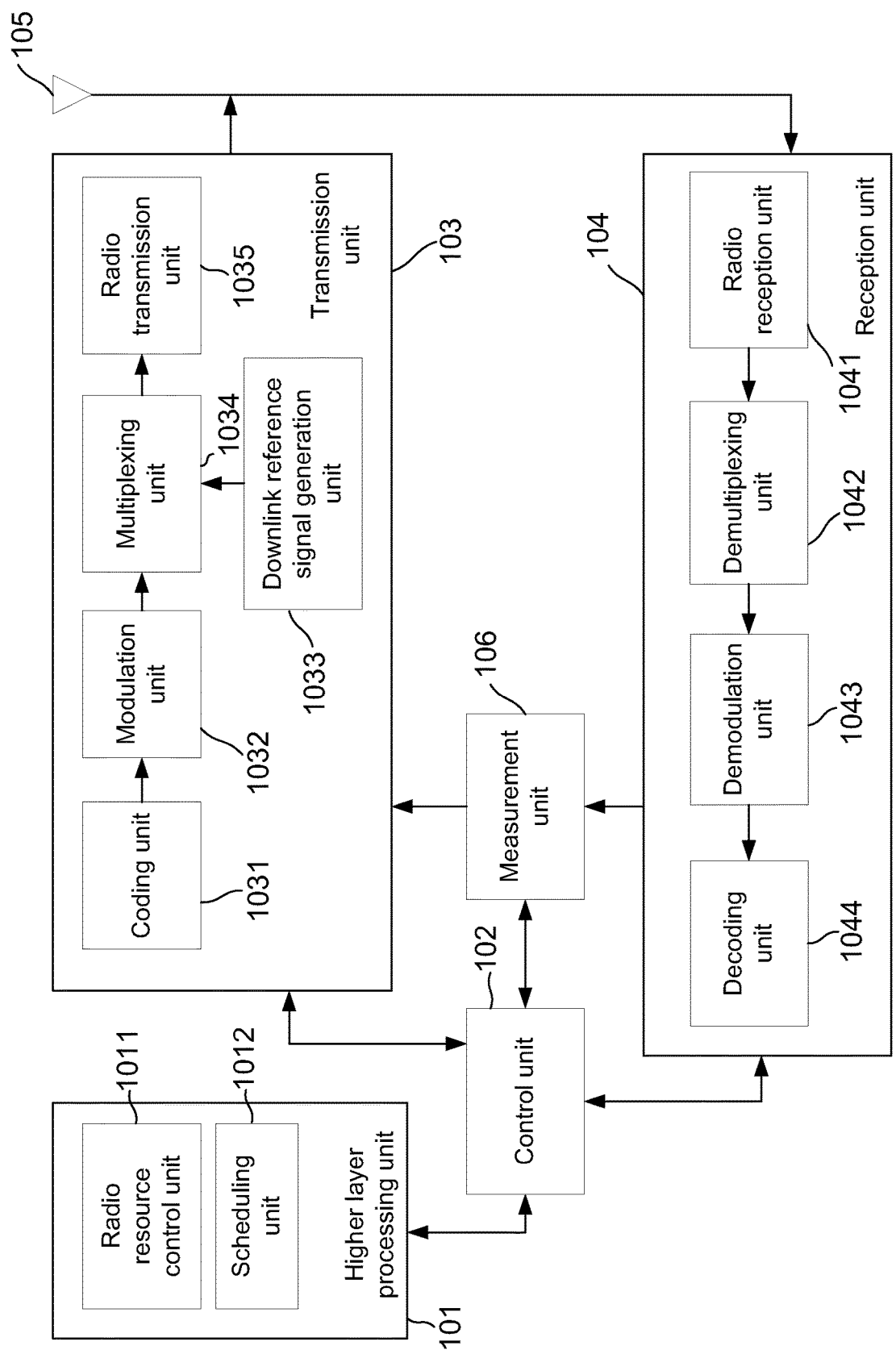
FIG. 2 is a block diagram of a base station device according to an aspect of the present disclosure.

FIG. 2 is a block diagram of the base station device according to the present implementation. As shown in FIG. 2, the base station device includes: a higher layer processing unit (higher layer processing step) 101, a control unit (controlling step) 102, a transmission unit (transmitting step) 103, a reception unit (receiving step) 104, a transmission/reception antenna 105, and a measurement unit (measuring step) 106. Furthermore, the higher layer processing unit 101 includes a radio resource control unit (radio resource controlling step) 1011 and a scheduling unit (scheduling step) 1012. Furthermore, the transmission unit 103 includes: a coding unit (coding step) 1031, a modulation unit (modulating step) 1032, a downlink reference signal generation unit (downlink reference signal generating step) 1033, a multiplexing unit (multiplexing step) 1034, and radio transmission unit (radio transmitting step) 1035. The reception unit 104 includes: a radio reception unit (radio receiving step) 1041, a demultiplexing unit (demultiplexing step) 1042, a demodulating unit (demodulating step) 1043, and a decoding unit (decoding step) 1044.

The higher layer processing unit 101 includes processing of a medium access control (MAC) layer, a packet data convergence protocol (PDCP) layer, a radio link control (RLC) layer, and a radio resource control (RRC) layer. Furthermore, the higher layer processing unit 101 generates information required for controlling the transmission unit 103 and the reception unit 104, and outputs the information to the control unit 102.

The higher layer processing unit 101 receives information about a terminal device, such as a terminal device capability (UE capability), from the terminal device. In other words, the terminal device transmits its capability to the base station device with a higher layer signal.

It is noted that, in the subsequent description, information relating to a terminal device may include information indicating whether the terminal device supports a predetermined function, or information indicating that the terminal device has completed introduction and testing of the predetermined function. It is noted that, in the subsequent description, whether a predetermined function is supported includes whether the introduction and testing of the predetermined function have been completed.

For example, when the terminal device supports a predetermined function, the terminal device transmits information (parameter) indicating whether the terminal device supports the predetermined function. When the terminal device does not support the predetermined function, the terminal device does not transmit information (parameter) indicating whether the terminal device supports the predetermined function. That is, whether to support the predetermined function is notified by transmitting information (parameter) indicating whether to support the predetermined function. It is noted that the information (parameter) indicating whether or not a predetermined function is supported may be notified using one bit of 1 or 0.

The radio resource control unit 1011 generates or obtain from a higher node downlink data (transport block), system information, a RRC message, a MAC CE, and others of the PDSCH configured for downlink. The radio resource control unit 1011 outputs downlink data to the transmission unit 103 and outputs other information to the control unit 102. Furthermore, the radio resource control unit 1011 manages various setting information of the terminal device.

The scheduling unit 1012 determines the frequencies and subframes assigned to the physical channels (PDSCH and PUSCH), the coding rates and the modulation schemes (or MCS) of the physical channels (PDSCH and PUSCH), the transmitting power, and others. The scheduling unit 1012 outputs the determined information to the control unit 102.

The scheduling unit 1012 generates information used for scheduling the physical channels (PDSCH and PUSCH) based on scheduling results. The scheduling unit 1012 outputs the generated information to the control unit 102.

The control unit 102 generates a control signal for controlling the transmission unit 103 and the reception unit 104 based on information input from the higher layer processing unit 101. The control unit 102 generates downlink control information based on the information input from the higher layer processing unit 101, and outputs the generated downlink control information to the transmission unit 103.

The transmission unit 103 generates a downlink reference signal according to the control signal input from the control unit 102; encodes and modulates the HARQ indicator, downlink control information, and downlink data input from the higher layer processing unit 101; multiplexes the PHICH, PDCCH, EPDCCH, PDSCH and downlink reference signal, and transmits the signal to the terminal device 2A via the transmission/reception antenna 105.

The coding unit 1031 uses block coding, convolutional coding, Turbo coding, low density parity check (LDPC) coding, Polar coding and others as predetermined coding methods, and performs coding to the HARQ indicator, downlink control information, and downlink data input from the higher layer processing unit 101, or uses a coding method determined by the radio resource control unit 1011. The modulation unit 1032 uses binary phase shift keying (BPSK), quadrature phase shift keying (QPSK), 16 quadrature amplitude modulation (QAM), 64 QAM, 256 QAM, or the like as predetermined scheme or uses a modulation scheme determined by the radio resource control unit 1011, and performs modulating to the code bits input from the coding unit 1031.

The downlink reference signal generation unit 1033 generates a sequence as the downlink reference signal. The sequence is obtained from a predetermined rule based on a physical cell identifier (PCI, cell ID) used to identify the base station device 1A or the like, and the sequence is known to the terminal device 2A.

The multiplexing unit 1034 multiplexes the modulated modulation symbol of each channel, the generated downlink reference signal, and the downlink control information. That is, the multiplexing unit 1034 configures the modulated modulation symbol of each channel, the generated downlink reference signal, and the downlink control information in a resource element.

The radio transmission unit 1035 generates an OFDM symbol by performing an inverse fast Fourier transform (IFFT) on the multiplexed modulation symbols and the like, and adds a cyclic prefix (CP) to the OFDM symbol to generate a digital signal of a baseband. The digital signal of a baseband is converted into an analog signal, undesirable frequency component is removed by filtering, up-converted to the transmission frequency, power-amplified, and output to the transmission/reception antenna 105 for transmission. The transmission power at this time is based on information set via the control unit 102.

The reception unit 104 separates, demodulates, and decodes the received signal received from terminal device 2A via the transmission/reception antenna 105 according to the control signal input from control unit 102, and outputs the decoded information to the higher layer processing unit 101. It is noted that the reception unit 104 also includes a function (step) of performing carrier-sense.

The radio reception unit 1041 converts an uplink signal received via the transmitting/reception antenna 105 into a baseband signal by down-conversion, removes undesirable frequency components, controls an amplifying level by suitably maintaining the signal level, performs quadrature demodulation based on the in-phase component and the quadrature component of the received signal, and converts the quadrature demodulated analog signal to a digital signal.

The radio reception unit 1041 removes a portion corresponding to the CP from the converted digital signal. The radio reception unit 1041 performs fast Fourier transform (FFT) to the signal that has the CP removed, extracts a signal in the frequency domain, and outputs the signal to the demultiplexing unit 1042.

The demultiplexing unit 1042 separates the signal input from the radio reception unit 1041 into signals such as PUCCH, PUSCH, and uplink reference signals. It is noted that the separation is predetermined by the base station device 1A via the radio resource control unit 1011, and is performed based on the radio resource assignment information included in the uplink grant notified to each terminal device 2A.

Furthermore, the demultiplexing unit 1042 performs compensation for the propagation paths of PUCCH and PUSCH. Furthermore, the demultiplexing unit 1042 divides an uplink reference signal.

The demodulation unit 1043 performs an inverse discrete Fourier transform (IDFT) on the PUSCH, obtains modulation symbols, and performs demodulation to the received signal on each of the PUCCH and PUSCH modulation symbols using BPSK, QPSK, 16 QAM, 64 QAM, 256 QAM, or the other predetermined demodulation schemes, or modulation schemes that the device itself notified to the terminal device 2A via an uplink grant in advance.

The decoding unit 1044 performs decoding to the demodulated coded bits of the PUCCH and the PUSCH with a coding rate of a predetermined coding scheme or the coding rate that the device itself notified the terminal device 2A via an uplink grant in advance, and outputs the decoded uplink data and uplink control information to the higher layer processing unit 101. When retransmitting the PUSCH, the decoding unit 1044 performs decoding using the coded bits stored in the HARQ buffer input from the higher layer processing unit 101 and the demodulated coded bits.

The measuring unit 106 observes the received signal and obtains various measurement values such as RSRP/RSRQ/RSSI. Furthermore, the measuring unit 106 obtains received power, received quality, and a preferred SRS resource index based on the SRS transmitted from the terminal device.

Figure 3:
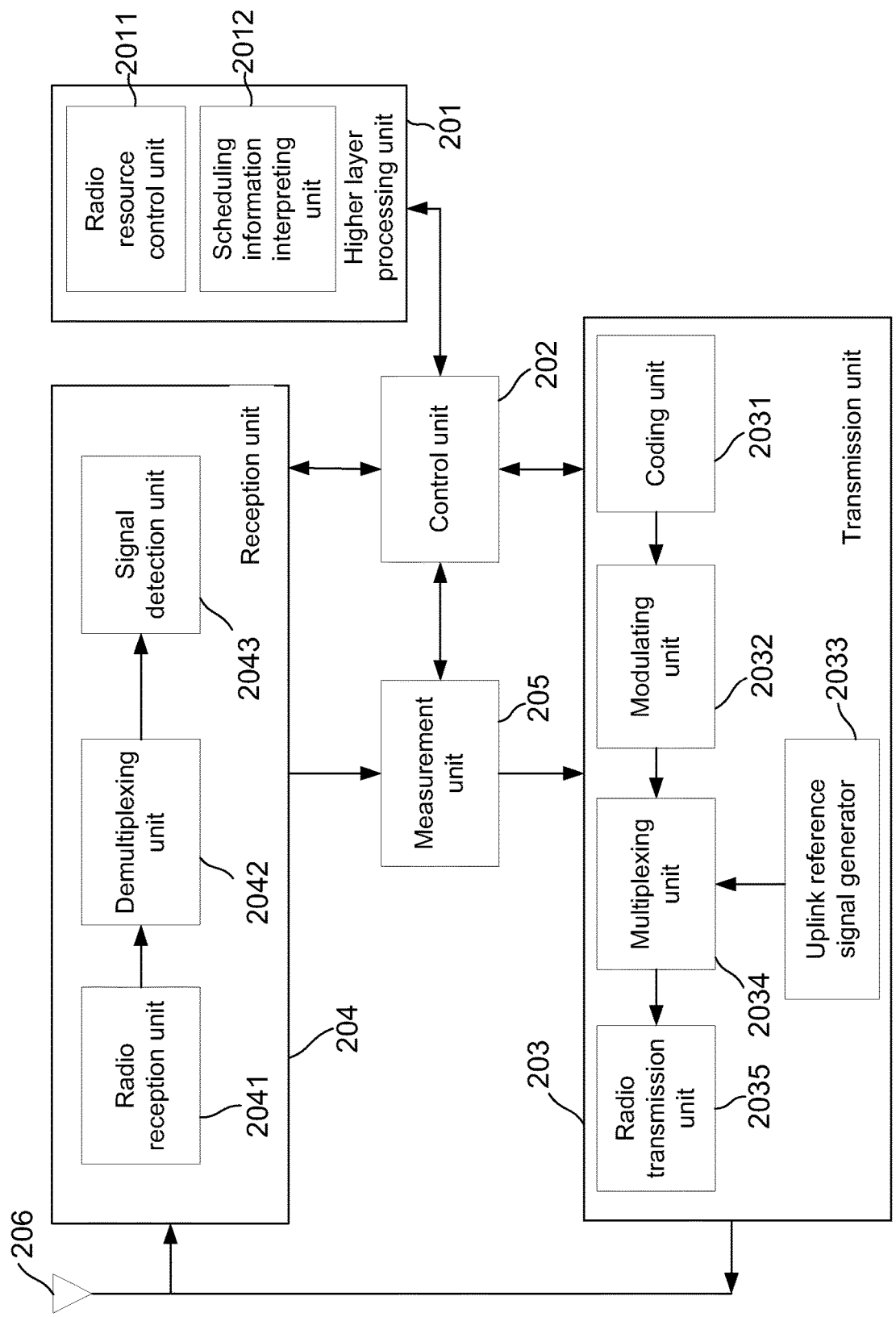
FIG. 3 is a block diagram of a terminal device according to an aspect of the present disclosure.

FIG. 3 is a block diagram of a terminal device according to an aspect of the present disclosure. As shown in FIG. 3, the terminal device includes: a higher layer processing unit (higher layer processing step) 201, a control unit (controlling step) 202, a transmission unit (transmitting step) 203, a reception unit (receiving step) 204, and a measuring unit (measuring step) 205, and a transmission/reception antenna 206. Furthermore, the higher layer processing unit 201 includes a radio resource control unit (radio resource controlling step) 2011 and a scheduling information interpreting unit (scheduling information interpretation step) 2012. Furthermore, the transmission unit 203 includes: a coding unit (coding step) 2031, a modulation section (modulating step) 2032, an uplink reference signal generation unit (uplink reference signal generating step) 2033, a multiplexing unit (multiplexing step) 2034, a radio transmission unit (radio transmitting step) 2035. The reception unit 204 includes: a radio reception unit (radio receiving step) 2041, a demultiplexing unit (demultiplexing step) 2042, and a signal detecting unit (signal detecting step) 2043.

The higher layer processing unit 201 outputs the uplink data (transport block) generated by user operation or the like to the transmission unit 203. The higher layer processing unit 201 includes processing of a medium access control (MAC) layer, a packet data integration protocol (PDCP) layer, radio link control (RLC) layer, and radio resource control (RRC) layers.

The higher layer processing unit 201 outputs information indicating the function of the terminal device supported by the terminal device itself to the transmission unit 203.

The radio resource control unit 2011 manages various setting information of the terminal device. Furthermore, the radio resource control unit 2011 generates information assigned to each uplink channel and outputs the information to the transmission unit 203.

The radio resource control unit 2011 obtains setting information transmitted from the base station device and outputs the setting information to the control unit 202.

The scheduling information interpreting unit 2012 interprets the downlink control information received via the reception unit 204 and determines scheduling information. Furthermore, the scheduling information interpreting unit 2012 generates control information for controlling the reception unit 204 and the transmission unit 203 based on the scheduling information, and outputs the generated control information to the control unit 202.

The control unit 202 based on the information input from the higher layer processing unit 201 generates a control signal for controlling the reception unit 204, the measuring unit 205, and the transmission unit 203. The control unit 202 outputs the generated control signal to the reception unit 204, the measuring unit 205, and the transmission unit 203 to control the reception unit 204 and the transmission unit 203.

The control unit 202 controls the transmission unit 203 with the method that the CSI/RSRP/RSRQ/RSSI generated by the measuring unit 205 transmits to the base station device.

The reception unit 204 separates, demodulates, and decodes the received signal received from the base station device via the transmission/reception antenna 206 according to the control signal input from control unit 202, and outputs the decoded information to the higher layer processing unit 201. It is noted that the reception unit 204 also includes a function (step) of performing carrier-sense.

The radio reception unit 2041 converts a downlink signal received via the transmission/reception antenna 206 into a baseband signal by down-conversion, removes undesirable frequency components, controls an amplifying level by suitably maintaining the signal level, performs quadrature demodulation based on the in-phase component and the quadrature component of the received signal, and converts the quadrature demodulated analog signal to a digital signal.

Furthermore, the radio reception unit 2041 removes a portion corresponding to the CP from the converted digital signal, performs fast Fourier transform to the signal that has the CP removed, and extracts a signal in the frequency domain.

The demultiplexing unit 2042 separates the extracted signal into a PHICH, a PDCCH, an EPDCCH, a PDSCH, and a downlink reference signal, respectively. Furthermore, the demultiplexing unit 2042 compensates the PHICH, the PDCCH, and the EPDCCH channels based on the channel estimation value of the expected signal obtained from the channel measurement, detects downlink control information, and output to the control unit 202. Furthermore, the control unit 202 outputs the channel estimation values of the PDSCH and the expected signal to the signal detection unit 2043.

The signal detection unit 2043 performs signal detection using the PDSCH and the channel estimation value, and outputs to the higher layer processing unit 201.

The measuring unit 205 performs various measurements such as CSI measurements, radio resource management (RRM) measurements, radio link monitoring (RLM) measurements, to obtain CSI/RSRP/RSRQ/RSSI and the like.

The transmission unit 203 generates an uplink reference signal according to the control signal input from the control unit 202, codes and modulates the uplink data (transport block) input from the higher layer processing unit 201, performs multiplexing to PUCCH, PUSCH and the generated uplink reference signal, and transmits to the base station device via the transmission//reception antenna 206.

The coding unit 2031 performs coding, such as convolution coding, block coding, Turbo coding, LDPC coding, and Polar coding, to the uplink control information or the uplink data input from the higher layer processing unit 201.

The modulating unit 2032 modulates uses BPSK, QPSK, 16 QAM, 64 QAM, or the like modulation schemes as notified by downlink control information or uses a modulation scheme predetermined for each channel, and performs modulating to the code bits input from the coding unit 2031.

The uplink reference signal generation unit 2033 generate a sequence obtained via the predetermined rule (formula) based on a physical cell identity (may be referred to as PCI, Cell ID, or the like) for identifying the base station device, a bandwidth for assigning the uplink reference signal, cyclic shift notified via an uplink grant, parameter value for generating the DMRS sequence, and the like.

The multiplexing unit 2034 multiplexes the PUCCH and PUSCH signals and the generated uplink reference signal for each transmission antenna port. That is, the multiplexing unit 2034 assigns the PUCCH and PUSCH signals and the generated uplink reference signal in the resource element for each transmission antenna port.

The radio transmission unit 2035 performs an inverse fast Fourier transform (Inverse Fast Fourier Transform: IFFT) to the multiplexed signal to performs OFDM modulation, generates an OFDMA symbol, adds a CP to the generated OFDMA symbol to generate a baseband digital signal, converts the baseband digital signal to an analog signal, removes undesirable frequency components, converts to a carrier frequency by up-conversion, amplifies power, outputs and transmits to transmission/reception antenna 206.

It is noted that the terminal device may perform modulation not limited to the OFDMA system, but also the SC-FDMA system.

When ultra-high-capacity communication such as ultra-high-definition video transmission is required, it is desirable to effectively utilize the high frequency band for ultra-wideband transmission. Transmission in the high frequency band, it may be required to compensate for path loss, and beamforming may become important. Furthermore, in an environment that exists a plurality of terminal devices in a confined area and ultra-large capacity communication is required for each terminal device, it is effective to configure the base stations to an ultra-dense network. However, when base stations are configured to high density, it may significantly improves the signal-to-noise power ratio (SNR), strong interference due to beamforming may occur. Therefore, in order to realize ultra-large capacity communication for all terminal devices in the confined area, interference control (avoidance, suppression, removal) of beamforming and/or coordinating communication of a plurality of base stations need to be considered.

Figure 4:
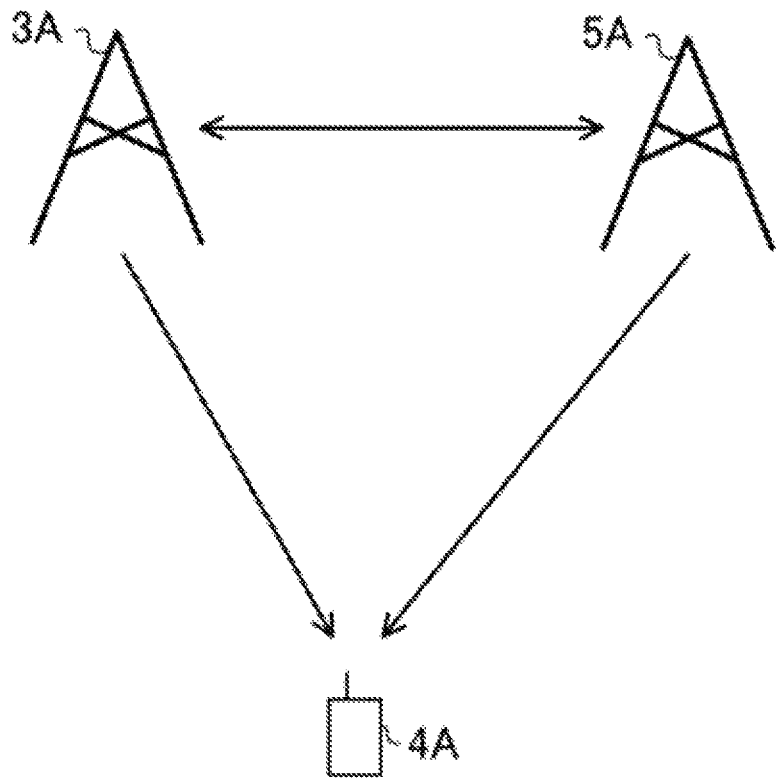
FIG. 4 is a schematic diagram of a communication system according to an aspect of the present disclosure.

FIG. 4 is a schematic diagram of a communication system according to an aspect of the present disclosure. The communication system as shown in FIG. 4 includes: a base station device 3A, a base station device 5A, and a terminal device 4A. The terminal device 4A may set the base station device 3A and/or the base station device 5A as a serving cell.

Furthermore, when the base station device 3A or the base station device 5A includes a plurality of antennas, the plurality of antennas may be divided into a plurality of sub-arrays (panels, sub-panels), and may apply transmitting/receiving beamforming according to each sub-array. In this example, each sub-array may include a communications device. Unless otherwise specified, the configuration of the communications device is the same as the configuration of the base station device as shown in FIG. 2. Furthermore, when the terminal device 4A includes a plurality of antennas, the plurality of antennas may be divided into a plurality of sub-arrays (panels, sub-panels), and may apply different transmitting/receiving beamforming according to each sub-array application. Each sub-array may include a communications device. Unless otherwise specified, the configuration of the communications device is the same as the configuration of the terminal device as shown in FIG. 3. It is noted that the base station device 3A and the base station device 5A may be referred to as base station devices. It is noted that the terminal device 4A may be referred to as a terminal device.

Synchronization signals are used to determine a preferred transmitting beam for the base station device and a preferred receiving beam for the terminal device. The base station device transmits a synchronization signal block (SS block, SSB) composed of PSS, PBCH, and SSS. It is noted that, within a synchronization signal block burst set cycle defined by the base station device, one or more synchronization signal blocks are transmitted in the time domain, and each synchronization signal block is set with a time index. Similar to the terminal device considering the synchronization signal block having the same time index within the synchronization signal block burst set period as a delay spread, a Doppler spread, a Doppler shift, an average gain, an average delay, a spatial receiving parameter and/or a spatial transmitting parameter, it may be considered, in certain way, as transmitting from the same location (quasi co-located, QCL). It is noted that the spatial receiving parameter may be, for example, a spatial correlation of a channel, an angle of arrival (Angle of Arrival), or the like. Furthermore, the spatial transmitting parameter may be, for example, a spatial correlation of a channel, a transmitting angle (Angle of Departure), or the like. That is, the terminal device may assume that, within the synchronization signal block burst set period, the synchronization signal blocks having the same time index are transmitted by the same transmitting beam, and the synchronization signal blocks having different time indices are transmitted by different beams. Therefore, if the terminal device reports information indicating a time index of a preferable synchronization signal block within the synchronization signal block burst set period to the base station device, the base station device may know that the transmitting beam suitable for the terminal device. Furthermore, the terminal device may obtain the receiving beam suitable for the terminal device by using a synchronization signal block having the same time index in different synchronization signal block burst set periods. Therefore, the terminal device may establish associations between the time index of the synchronization signal block and the receiving beam direction and/or the sub-array. It is noted that when the terminal device includes a plurality of sub-arrays, the terminal device may use different sub-arrays when connecting to different cells.

Furthermore, to ensure the transmitting beam of a suitable base station device and the receiving beam of a suitable terminal device may use CSI-RS, the base station device may set the setting information using the signal of the higher layer. For example, the setting information includes a part or all of the resource setting and the report setting.

The resource setting includes a resource setting ID, a resource setting type and/or one or more of CSI-RS resource set settings. The resource setting ID is used for determining a setting of the resource. The resource setting type indicates the operation of the resource setting in the time domain. Specifically, the resource setting type indicates an aperiodic transmission of the CSI-RS, a periodic transmission of the CSI-RS, or a semi-persistent transmission of the CSI-RS. The CSI-RS resource set setting includes a CSI-RS resource set setting ID and/or one or more CSI-RS resource settings. The CSI-RS resource set setting ID is used to determine the CSI-RS resource set setting. The CSI-RS resource setting includes a CSI-RS resource setting ID, a resource setting type, the number of antenna ports, CSI-RS resource mapping, and a part or all of the power offset between the CSI-RS and PDSCH. The CSI-RS resource setting ID is used to determine the CSI-RS resource setting, and the CSI-RS resource is associated with the CSI-RS resource setting ID. The CSI-RS resource mapping indicates a resource element (OFDM symbol, subcarrier) in the CSI-RS in the assigned slot.

The resource setting is used for CSI measurement or RRM measurement. The terminal device receives the CSI-RS with the configured resource, calculates the CSI from the CSI-RS, and reports the CSI to the base station device. Furthermore, when the CSI-RS resource set setting includes a plurality of CSI-RS resource settings, the terminal device receives the CSI-RS with the same receiving beam with each CSI-RS resource and calculates the CRI. For example, when the CSI-RS resource set setting includes K (K is an integer larger or equal to 2) number of CSI-RS resource settings, the CRI indicates N number of preferable CSI-RS resources of the K number of CSI-RS resources. In this example, N is a positive integer less than K. Furthermore, when the CRI indicates a plurality of CSI-RS resources, in order to indicate which CSI-RS resource is of a good quality, the terminal device may report the CSI-RSRP measured on each CSI-RS resource to the base station device. If the base station device performs beamforming (precoding) to the CSI-RS in different beam directions with the plurality of configured CSI-RS resources and transmits the CSI-RS, the base station device may know the transmitting beam direction of the base station suitable for the terminal device based on the CRI reported from the terminal device. On the other hand, the receiving beam direction of the preferable terminal device may be determined using the CSI-RS resources that are secured for the transmitting beam of the base station device. For example, the base station device, for a CSI-RS resource, transmits information indicating whether the transmitting beam of the base station device is secured and/or the period during which the transmitting beam is secured. The terminal device may obtain a preferable receiving beam direction from the CSI-RS received in different receiving beam directions with the CSI-RS resources secured for the transmitting beam. It is noted that the terminal device may report the CSI-RSRP after determining a preferable receiving beam direction. It is noted that when the terminal device has a plurality of sub-arrays, the terminal device may select a preferable sub-array when a preferable receiving beam direction has been obtained. It is noted that that the preferable receiving beam direction of the terminal device may be associated with the CRI. Furthermore, when the terminal device reports a plurality of CRIs, the base station device may secure transmitting beams on the CSI-RS resources associated with each CRI. Wherein, the terminal device may determine a preferable receiving beam direction for each CRI. For example, the base station device may establish associations with a downlink signal/channel and a CRI for transmission. Wherein, the terminal device has to receive with the receiving beam that is associated with the CRI. Furthermore, different base station devices may transmit CSI-RSs in a plurality of configured CSI-RS resources. In this situation, the network side may know from the CRI that which base station device is of a good communication quality. Furthermore, when the terminal device has a plurality of sub-arrays, it may receive signals at the same timing via the plurality of sub-arrays. Therefore, if the base station device establishes associations between the CRI and each of a plurality of layers (codewords, transport blocks) with the downlink control information or the like for transmission, the terminal device may use the sub-array corresponding to each CRI and the receiving beam to receive multiple layers. Wherein, when using an analog beam and one sub-array having one receiving beam direction used at the same timing, and when the two CRIs corresponded to one sub-array of the terminal device being configured at the same time, the terminal device may be able to receive with multiple receive beams. To address this issue, for example, the base station device divides a plurality of configured CSI-RS resources into groups, and obtains a CRI within the group using the same sub-array. If different sub-arrays are used between groups, the base station device may know the plurality of CRIs that can be set at the same timing. It is noted that the CSI-RS resource group may be a CSI-RS resource set. It is noted that the CRI that can be set at the same timing may be set as a QCL. Wherein, the terminal device may establish association with the QCL information for transmitting the CRI. For example, if the terminal device distinguishes the CRI that is a QCL and the CRI that is not a QCL for reporting, the base station device may not set the CRI that is a QCL at the same timing, and sets the CRI that is not a QCL at the same timing. Furthermore, the base station device may request CSI for each sub-array of the terminal device. In this situation, the terminal device reports the CSI for each sub-array. It is noted that, when reporting a plurality of CRIs to the base station device, the terminal device may only report the CRIs that is not a QCL.

The report setting is a setting related to the CSI report, and includes a report setting ID, a report setting type and/or a report value (quantity). The report setting ID is used to determine the report setting. The reported value (quantity) is the reported CSI value (quantity). The report setting type is to report the setting for an aperiodic reported CSI value (quantity), the setting for a periodic reported CSI value (quantity), or the setting for a semi-persistent reported CSI value (quantity).

When reporting CSI aperiodically or semi-persistently, the base station device transmits a trigger to start reporting the CSI to the terminal device. The trigger may be a DCI or a higher layer signaling.

Furthermore, to determine a preferable transmission beam of the base station device, a codebook that defines candidates of a predetermined precoding (beamforming) matrix (vector) is used. The base station device transmits the CSI-RS, and the terminal device obtains a suitable precoding (beamforming) matrix from the codebook and reports it to the base station device as PMI. Thereby, the base station device may know the transmitting beam direction suitable for the terminal device. It is noted that the codebook includes a precoding (beamforming) matrix for combining antenna ports and a precoding (beamforming) matrix for selecting antenna ports. When using the codebook for selecting antenna ports, the base station device may use a different transmitting beam directions for each antenna port. Therefore, if the terminal device reports a preferable antenna port as the PMI, the base station device may know the preferable transmitting beam direction. It is noted that the preferable receiving beam of the terminal device may be of the receiving beam direction associated with the CRI, or the preferable receiving beam direction may be determined again. When using the codebook for selecting an antenna port and the preferable receiving beam direction of the terminal device is the receiving beam direction associated with the CRI, the receiving beam direction for receiving the CSI-RS is ideally received in the receiving beam direction associated with the CRI. It is note that even when using the receiving beam direction associated with the CRI, the terminal device may also associate the PMI with the receiving beam direction. Furthermore, when using the codebook for selecting an antenna port, each antenna port may be transmitted from different base station devices (cells). In this situation, if the terminal device reports the PMI, the base station device may know which base station device (cell) is of a good communication quality. It is noted that, in this situation, the antenna ports of different base station devices (cells) may be set to be not QCLs.

When the CSI is reported on PUSCH or the subband CSI is reported on PUCCH, the CSI is divided into two parts for reporting. Furthermore, the CSI report includes a type 1 CSI report and a type 2 CSI report. In the type 1 CSI report, the CSI based on the type 1 codebook (also referred to as type 1 CSI) is reported. In the type 2 CSI report, the CSI based on the type 2 codebook (also referred to as type 2 CSI) is reported. Furthermore, the two parts are also referred to as a first part (part 1, CSI part 1) and a second part (part 2, CSI part 2). The first part has a higher priority for CSI reporting than the second part. For example, when RI is 4 or less, the first part includes a part or all of the sum of the first RI and the second RI (or the second RI), the second CRI, the first CRI and the CQI based on the second CRI. The second part includes a part or all of the first CRI, the first RI, the first CQI, the first PMI, and the second PMI. When the RI is greater than 4, the first part includes the sum of the first RI and the second RI (or the second RI), the second CRI, a part or all of a second CQI. The second part includes a part or all of the first CRI, the first RI, the first CQI, the first PMI, and the second PMI. The CSI may be divided into three. The third part is also referred to as a third part (part 3, CSI part 3). The third part has a lower priority than the second part. Here, the first part includes a part or all of a sum of the first RI and the second RI (or the second RI), the second CRI, the first CRI and the CQI based on the second CRI (or the second CQI). The second part includes a part or all of the first CRI, the first RI, and the first CQI. The third part includes a part or all of the first PMI and the second PMI.

The terminal device may divide each CSI based on the first CRI and divide each CSI based on the second CRI into two parts and report the two parts. The two parts of the CSI based on the first CRI are also referred to as a first part 1 and a first part 2. The two parts of the CSI based on the second CRI are also referred to as a second part 1 and a second part 2. The first part 1 includes a part or all of the first CRI, the first RI, and the first CQI. Furthermore, the first part 2 includes a first PMI. Furthermore, the second part 1 includes a part or all of the second CRI, the second RI, and the second CQI. Furthermore, the second part 2 includes a second PMI. The priority of CSI can be set higher in the order of the second part 1, the first part 1, the second part 2, and the first part 2. In this situation, the terminal device reports a long-period (few changes) CSI of the second CRI and the first CRI, and the base station device and the terminal device perform communications using parameters of lowest limit related to at least the first CRI and the second CRI. Furthermore, the priority of CSI can be set higher in the order of the second part 1, the second part 2, the first part 1, and the first part 2. In this situation, the terminal device reports the complete CSI in the second CRI with priority, so that the base station device and the terminal device can perform communications using detailed parameters related to the second CRI.

Other than the serving cell, the terminal device 4A may receive an interference signal (adjacent cell interference) from an adjacent cell. The interference signal may be a PDSCH, PDCCH, or reference signal of an adjacent cell. In this situation, the removal or suppression of the interference signal in the terminal device may be effective. To remove or suppress the interference signal, the applicable methods are: enhanced-minimum mean square error (E-MMSE) that estimates the channel of the interference signal and apply linear weighted suppression, an interference canceller that generates and removes the interference signal copies; maximum likelihood detection (MLD) that searches all transmitting signal candidates of desirable signals and interference signals and detects the desirable signals, and reduced complexity-MLD (R-MLD) that reduces the number of transmitting signal candidates and set its computation to be less than MLD. To apply these methods, it may require to perform channel estimation of the interference signal, demodulation of the interference signal, or decoding of the interference signal. Therefore, in order to effectively remove or suppress the interference signal, the terminal device may need to know the parameters of the interference signal (adjacent cell). Therefore, in order to assist the terminal device to remove or suppress the interference signal, the base station device may transmit (set) one or more pieces of assist information including parameters of the interference signal (adjacent cell) to the terminal device. One or more of assist information may be set. The assist information includes a part or all of, for example, a physical cell ID, a virtual cell ID, a power ratio (power offset) of the reference signal and the PDSCH, a scrambling ID of the reference signal, quasi co-location information (QCL) information, the CSI-RS resource setting(s), the number of CSI-RS antenna ports, subcarrier spacing(s), resource assignment granularity, resource assignment information, DMRS setting(s), DMRS antenna port number, the number of layers, TDD DL/UL configurations, PMI, RI, modulation scheme, and modulation and coding scheme (MCS). It is noted that the virtual cell ID is an ID virtually assigned to a cell, and there may be cells that have the same physical cell ID but different virtual cell IDs. The QCL information is information relating to the QCL for predetermined antenna port(s), predetermined signal(s), or predetermined channel(s). On two antenna ports, when the long interval characteristics of the channel used for transmitting symbols on one antenna port can be deduced based on the channel used for transmitting symbols on the other antenna port, these antenna ports are referred to as QCL. The long interval characteristics include delay spread, Doppler spread, Doppler shift, average gain, average delay, spatial receiving parameters, and/or spatial transmitting parameters. That is, when the two antenna ports are QCL, the terminal device may consider the long interval characteristics at these antenna ports to be the same. The subcarrier spacing indicates a subcarrier spacing of the interference signal or a candidate of a subcarrier interval that may be used in the band. It is noted that when the subcarrier spacing included in the assist information is different to the subcarrier spacing used for communication with the serving cell, the terminal device may not remove or suppress the interference signal. The subcarrier spacing candidates that may be used in the band may indicate a subcarrier spacing that is typically used. For example, the typically-used subcarrier spacing may not include a low frequency subcarrier spacing as used in ultra-reliable and low-latency communications (emergency communications). The resource assignment granularity indicates the number of resource blocks that are not changed by precoding (beamforming). The DMRS setting indicates a PDSCH mapping type and additional configurations of the DMRS. DMRS resource assignment may change according to the PDSCH mapping type. For example, for the PDSCH mapping type A, the DMRS is mapped to the third symbol of the slot. Furthermore, for example, the PDSCH mapping type B is mapped to the first OFDM symbol of the assigned PDSCH resource. The additional configurations of the DMRS indicates whether there is an additional DMRS configurations or the additional configurations. It is noted that some or all of the parameters included in the assist information are transmitted (set) by higher layer signals. Furthermore, some or all of the parameters included in the assist information are transmitted with downlink control information. Furthermore, when each parameter included in the assist information indicates a plurality of candidates, the terminal device blind-detects a preferable parameter from the candidates. Furthermore, the terminal device performs blind detection on parameters that are not included in the assist information.

When a terminal device communicates with a plurality of receiving beam directions, surrounding interference situations change significantly according to the receiving beam directions. For example, an interference signal that was strong in one receiving beam direction may become weak in another receiving beam direction. The assist information of the cell that has low likelihood to have strong interference is not only meaningless, but may cause unnecessary calculation when determining whether a strong interference signal is received. Therefore, it may be ideal to have the assist information set based on the receiving beam direction. However, since the base station device may not know the receiving direction of the terminal device, it may be sufficient to associate the information related to the receiving beam direction with the assist information. For example, since the terminal device may associate the CRI with the receiving beam direction, the base station device may transmit (set) one or more pieces of assist information for each CRI. Furthermore, since the terminal device may associate the receiving beam direction with the time index of the synchronization signal block, the base station device may transmit (set) one or more pieces of assist information for each time index of the synchronization signal block. Furthermore, since the terminal device may associate the antenna port number (PMI) with the receiving beam direction, the base station device may transmit (set) one or more pieces of assist information for each antenna port number (PMI). Furthermore, when the terminal device includes a plurality of sub-arrays, the receiving beam direction has a likelihood to change for each sub-array, and therefore, the base station device may transmit (set) one or more pieces of assist information for each index associated with the sub-array of the terminal device. Furthermore, when a terminal device communicates with a plurality of base station devices (transmission/reception points), the terminal device is likely to communicate with each base station device (transmission/reception points) in different receiving beam directions.

Therefore, the base station device may transmit (set) one or more pieces of assist information for each information indicating the base station device (transmission/reception point). The information indicating the base station device (transmission/reception point) may be set as a physical cell ID or a virtual cell ID. Furthermore, when the base station device (transmission/reception point) uses a different DMRS antenna port number, the information indicating the DMRS antenna port number and the DMRS antenna group becomes information indicating the base station device (transmission/reception point).

It is noted that the number of pieces of assist information set by the base station device for each CRI may be a common number. Herein, the number of assist information includes the type of assist information, the number of elements of each assist information (for example, the number of cell ID candidates), and the like. Furthermore, a maximum value is set for the number of pieces of assist information set by the base station device for each CRI, and the base station device may set the assist information for each CRI within range of the maximum value.

It is noted that, when the receiving beam direction of the terminal device changes, it is likely that the transmission antenna is not QCL. Therefore, the assist information can be associated with the QCL information. For example, when the base station device transmits (sets) the assist information of a plurality of cells, a cell that is a QCL (or a cell that is not a QCL) may be instructed to the terminal device.

It is noted that the terminal device removes or suppresses the interference signal using the assist information associated with the CRI used in communicating with the serving cell.

Furthermore, the base station device may set the assist information associated with the receiving beam direction (CRI/time index of synchronization signal block/PMI/antenna port number/sub-array) and the assist information not associated with the receiving beam direction receiving beam direction (CRI/time index of synchronization signal block/PMI/antenna port number/sub-array). Furthermore, the assist information associated with the receiving beam direction and the assist information not associated with the receiving beam direction may be selectively used according to the terminal device capabilities or types. The capability or type of the terminal device may indicate whether the terminal device supports receiving beamforming. Furthermore, the assist information associated with the receiving beam direction and the assist information not associated with the receiving beam direction may be selectively used according to frequency bands. For example, the base station device does not set the assist information associated with the receiving beam direction at a frequency lower than 6 GHz. Furthermore, for example, the base station device sets the assist information associated with the reception beam direction only at a frequency higher than 6 GHz.

It is noted that the CRI may be associated with the CSI resource set setting ID. When instructing the CRI to the terminal device, the base station device may instruct the CRI and the CSI resource set setting ID together. When the CSI resource set setting ID is associated with one CRI or one receiving beam direction, the base station device may set the assist information for each CSI resource set setting ID.

In order to know the adjacent cell that is related to the receiving beam direction of the terminal device, the base station device requests the adjacent cell measurement of the terminal device. The adjacent cell measurement request includes information related to the reception beam direction of the terminal device and the cell ID. When the terminal device receives the adjacent cell measurement request, the terminal device measures the RSRP/RSRQ/RSSI of the adjacent cell and reports the measurements to the base station device together with information related to the receiving beam direction of the terminal device. It is noted that the information related to the receiving beam direction of the terminal device may include information indicating a CRI, a time index of a synchronization signal block, a sub-array of the terminal device, or a base station device (transmission/reception point).

Furthermore, when the terminal device moves, the surrounding environment may change instantaneously. Therefore, it may be ideal that the terminal device makes observations to the surrounding channel conditions, interference conditions at a predetermined timing, and reports the results to the base station device. Reporting of the results may be made periodically or on the basis of events. When reporting periodically, the terminal device periodically measures RSRP/RSRQ using a synchronization signal or CSI-RS and reports accordingly. When reporting on the basis of events, the event ID is associated with the reporting condition. The event IDs may include, for example, the events described in the subsequent paragraphs. The event IDs also set the thresholds desirable for conditional calculations (Threshold 1, Threshold 2, when desirable) and offset value(s).

Event A1: When the measurement result of the serving cell is better than the set threshold.
Event A2: When the measurement result of the serving cell is worse than the set threshold.
Event A3: When the measurement result of the adjacent cell is better than the measurement result of PCell/PSCell by the set offset value or more.
Event A4: When the measurement result of the adjacent cell is better than the set threshold value.
Event A5: When the measurement result of PCell/PSCell is worse than the set Threshold 1, and the measurement result of the adjacent cell is better than the set threshold 2.
Event A6: When the measurement result of the adjacent cell is better than the measurement result of SCell by a set offset value or more.
Event C1: When the measurement result at the CSI-RS resource is better than the set threshold.
Event C2: When the measurement result at the CSI-RS resource is better than the measurement result of the set reference CSI-RS resource by the offset value or more.
Event D1: When the measurement result of the CSI-RS resource that is different from the CRI is better than a set threshold.
Event D2: When the measurement result of the CSI-RS resource that is related to the CRI is worse than the set threshold.
Event D3: When the measurement result of the receiving beam direction that is not related to the CRI is better than the set threshold value.
Event D4: When the measurement result of the SS block index used for synchronization is worse than the set threshold.
Event D5: When the measurement result of the SS block index not used for synchronization is worse than the set threshold.
Event E1: When the time since the base station device determined the beam exceeds the threshold.
Event E2: When the time since the terminal device determined the beam exceeds the threshold.

The terminal device, when reporting based on the report settings, reports SS-RSRP/SS-RSRQ/CSI-RSRP/CSI-RSRQ/RSSI as a measurement result.

Figure 5:
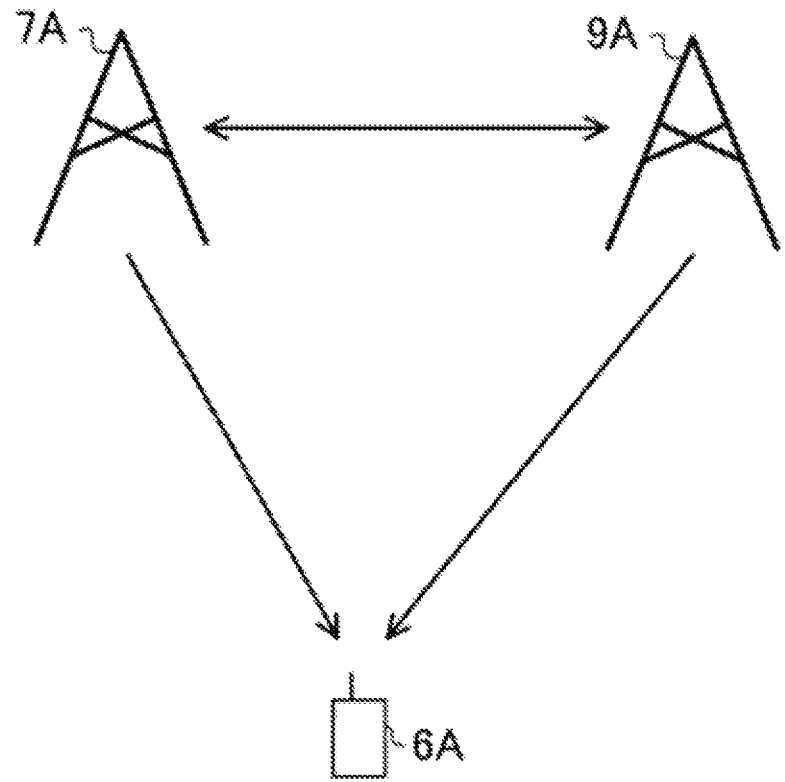
FIG. 5 is a schematic diagram of a communication system according to an aspect of the present disclosure.

FIG. 5 is a schematic diagram of a communication system according to an aspect of the present disclosure. The communication system shown in FIG. 5 includes: a base station device 7A, a base station device 9A, and a terminal device 6A. The terminal device 6A may set the base station device 7A and/or the base station device 9A as a serving cell. Furthermore, when the base station device 7A or the base station device 9A includes a plurality of antennas, the plurality of antennas may be divided into a plurality of sub-arrays (panels, sub-panels), and may apply transmission/reception beamforming according to each sub-array. In this example, each sub-array may include a communications device. Unless otherwise specified, the configuration of the communications device is the same as the configuration of the base station device as shown in FIG. 2. Furthermore, when the terminal device 6A includes a plurality of antennas, the plurality of antennas may be divided into a plurality of sub-arrays (panels, sub-panels), and may apply different transmission/reception beamforming according to each sub-array application. Each sub-array may include a communications device. Unless otherwise specified, the configuration of the communications device is the same as the configuration of the terminal device as shown in FIG. 3. It is noted that the base station device 7A and the base station device 9A may be referred to as base station devices. It is noted that the terminal device 6A may be referred to as a terminal device.

In the uplink, the SRS may be used to determine a preferable transmitting beam for the terminal device and a preferable receiving beam for the base station device. The base station device may transmit (set) setting information related to the SRS using a signal of a higher layer. The setting information includes one or more SRS resource set settings. The SRS resource set setting includes an SRS resource set setting ID and/or one or more SRS resource settings. The SRS resource set setting ID may be used to determine the SRS resource set setting. The SRS resource setting includes: an SRS resource setting ID, the number of SRS antenna ports, an SRS transmission comb, an SRS resource mapping, an SRS frequency hopping, and an SRS resource setting type. The SRS resource setting ID may be used to determine the SRS resource setting. The SRS transmission comb indicates the frequency interval of the comb tooth spectrum and the location (offset) within the frequency interval. The SRS resource mapping indicates OFDM symbol locations and the number of OFDM symbols of the SRS arranged in a slot. The SRS frequency hopping is information indicating SRS frequency hopping. The SRS resource setting type indicates the operations in the time domain of the SRS resource setting. Specifically, it indicates the SRS resource setting being a setting of transmitting an SRS non-periodically (aperiodic), a setting for transmitting an SRS periodically, or a setting for transmitting an SRS semi-persistently.

When the terminal device is set with a plurality of SRS resources, if the terminal device transmits the SRS resources in different transmission beam directions, the base station device may determine a preferable SRS resource. The base station device only needs to transmit (instruct) the information indicating the SRS resources which is the SRS resource indicator (SRI) to the terminal device, the terminal device is then able to know that the transmitting beam direction transmitted with the SRS resource is preferable. It is noted that, in order to obtain the preferable receiving beam of the base station device, the base station device may request the terminal device to transmit with the same transmitting beam for a predetermined period. In response to the request from the base station device, the terminal device transmits in the instructed period, with the instructed SRS resource, and in the same transmitting beam direction as that transmitted in the instructed SRI.

When a terminal device includes a plurality of sub-arrays, the terminal device may communicate with a plurality of base station devices (transmission/reception points). In the example of FIG. 5, the terminal device 6A may set the base station device 7A and the base station device 9A as serving cells. In this situation, with respect to the terminal device 6A, the transmitting beam direction suitable for communication with the base station device 7A is likely to be different to the transmitting beam direction suitable for communication with the base station device 9A. Therefore, the terminal device 6A can communicate with the base station device 7A and the base station device 9A at the same timing by transmitting signals in different sub-arrays in different transmitting beam directions.

When a terminal device transmits an SRS using a plurality of antenna ports in a SRS resource, each antenna port may use different transmitting beam directions. In this situation, if the base station device sends a transmitting instruction at the preferable antenna port number to the terminal device, the terminal device may know the preferable transmitting beam direction. It is noted that the base station device may also instruct the terminal device to transmit PMI (TPMI) using a codebook for selecting an antenna port. The base station device may also instruct the terminal device which codebook to refer to. The terminal device may refer the instructed codebook and use the transmitting beam direction corresponding to the antenna port number indicated by the TPMI.

When a terminal device includes a plurality of sub-arrays and can transmit at the same timing with the plurality of sub-arrays, different antenna port numbers may be assigned among the sub-arrays. In this situation, if the terminal device transmits an SRS using a transmitting beam from a different antenna port of the sub-array and receives a TPMI from the base station device, the terminal device can know the preferable sub-array and transmitting beam direction. Therefore, the terminal device can associate the TPMI with the sub-array and the transmitting beam direction.

It is noted that, when the terminal device communicates with a plurality of base station devices (transmission/reception points), the same signal (data) can be transmitted to each base station device (transmission/reception point), and different signals (data) can also be transmitted. When a terminal device communicates with a plurality of base station devices (transmission/reception points) with the same signal (data), signals received by a plurality of base station devices (transmission/reception points) may be combined to improve the receiving quality. Therefore, it is ideal that a plurality of base station devices (transmission/reception points) perform the receiving process in cooperation.

The base station device may use DCI for PUSCH scheduling. When a terminal device communicates with a plurality of base station devices, each base station device may transmit DCI for PUSCH scheduling. The DCI includes SRI and/or TPMI, and a terminal device can know a transmitting beam suitable for the base station device. Furthermore, when the terminal device communicates with a plurality of base station devices, the DCI from one base station device may be used to transmit the PUSCH to the plurality of base station devices. For example, when the DCI includes control information for a plurality of layers (codewords and transport blocks) and the SRI and/or TPMI is instructed (set) for each layer, each layer transmits with the suitable transmitting beam corresponded to each base station device. Accordingly, when the terminal device receives one DCI, the terminal device can transmit different signals (data) to a plurality of base station devices. Furthermore, when the DCI includes control information of one layer and when a plurality of SRIs and/or TPMIs are instructed (set) for one layer, the terminal device uses different transmitting beam to transmit one layer (the same data). Accordingly, when the terminal device receives one DCI, the terminal device can transmit the same signal (data) to a plurality of base station devices.

When a terminal device transmits to a plurality of base station devices at the same timing, it is ideal that each base station device knows the communication quality with the terminal device at the same timing. Accordingly, the base station device may instruct (trigger) a plurality of SRIs and SRS resources corresponding to each SRI with one DCI. In other words, if the terminal device transmits the SRS at the same timing in the transmitting beam direction corresponding to each SRI, each base station device then can know the communication quality with the terminal device at the same timing.

When the sub-arrays included in the terminal device use only one transmission beam direction at the same timing, they are transmitted to a plurality of base station devices at different timings using different sub-arrays. In this situation, when two SRIs are instructed (set) by one DCI from the base station device and the two SRIs are associated with the same subarray, the terminal device may not be able to transmit the two corresponding SRIs at the same timing. To avoid this problem, for example, the base station device may request the terminal device to: set a plurality of SRS resources in groups, and to transmit the SRS using the same sub-array within the group. Furthermore, if different sub-arrays are used among the groups, the base station device can know a plurality of SRIs that can be set at the same timing. It is noted that the groups of SRS resources may be the SRS resource sets. It is noted that the SRS (SRS resource) that may be set at the same timing may be set to be not QCL. In this situation, the terminal device may establish associations with the QCL information for transmitting the SRS. For example, if the terminal device distinguishes the SRS that is QCL from the SRS that is not the QCL and transmits accordingly, the base station device may not set the SRI that is the QCL at the same timing, and sets the SRI that is not the QCL at the same timing. Furthermore, the base station device may request the SRS for each sub-array of the terminal device. In this situation, the terminal device transmits SRS for each sub-array.

It is noted that, when the terminal device instructs that two SRIs cannot be transmitted at the same timing from the base station device, the terminal device may request the base station device to perform a beam recovery procedure for selecting a transmission beam again. The beam recovery procedure is the procedure performed when the tracking of a transmitting/receiving beam between the terminal device and the base station device is deviated which results in significant decrease in the communication quality, the terminal devices may need to obtain a new connection destination (transmitting beam of the base station device) in advance. The terminal device of the present implementation is in a state that the transmitting beam itself is secured, but the beam recovery procedure may be performed in order to eliminate a state with the setting that two SRIs cannot be transmitted at the same timing.

The terminal device of the present implementation may include a plurality of antennas (antenna panels) set with independent beamforming. The terminal device of the present implementation may use a plurality of antenna panels. The terminal device may switch between the plurality of antenna panels. However, when the antenna panel is not suitably selected, the transmitting quality may be significantly decreased, particularly in high-frequency transmission. Therefore, for selecting the beamforming set for the antenna, the terminal device may perform beam scanning (exploring) among the base station devices. The terminal device of the present implementation can transmit an SRS for beam scanning.

The base station device of the present implementation may notify the terminal device of the information relating to the duality (correlation, opposition) of the downlink and uplink transmission (channel) characteristics. With the information of the transmission characteristics, the base station device may notify the terminal device of the information of beam correspondence, spatial relations, spatial relation information (spatial relation information, receiving parameters). Herein, the beam correspondence includes: the relationship information between the receiving beamforming (spatial domain reception filter, receiving weightings, receiving parameters, receiving space parameters) used when the terminal device receives a downlink signal and the transmitting beamforming (spatial domain transmission filter, transmitting weightings, transmitting parameters, transmitting space parameters) used when transmitting an uplink signal.

The base station device may set beam correspondence for each signal transmitted by the terminal device. For example, the base station device can notify the terminal device of information indicating beam correspondence for the SRS transmitted by the terminal device. The base station device can notify the terminal device of SRS spatial relation information (SRS-SpatialRelationInfo) When the SRS spatial relation information indicates a predetermined signal (value, state), the terminal device may perform SRS transmission using beamforming associated with the predetermined signal. For example, if the SRS spatial relation information specifies a synchronization signal (SSB and PBCH), the terminal device may transmit the SRS using the receiving beamforming used when receiving the synchronization signal. Similarly, the base station device may notify the spatial relation information relating to other signals (for example, PUCCH/PUSCH/RS/RACH and others) transmitted by the terminal device, and other signals (for example, PDCCH/PDSCH/RS) received by the terminal device. That is, the base station device can notify the terminal device of the spatial relation information of the first signal and the second signal. When the terminal device receives the spatial relation information of the first signal and the second signal and recognizes that the spatial relation information guarantees the spatial relations between the first signal and the second signal, the receiving parameter for receiving the first signal (or the transmitting parameter for transmitting the first signal) may be used to transmit the second signal (or receive the second signal).

The QCL includes at least the following four types, each having different parameters that can be considered the same. The base station device and the terminal device may set any one of the following QCL types between the antenna ports (or the signals associated with the antenna ports), and may also set a plurality of QCL types simultaneously.

QCL Type A: Doppler shift, Doppler spread, average delay, delay spread
QCL Type B: Doppler shift, Doppler spread
QCL Type C: Doppler shift, average delay
QCL Type D: Spatial Rx When the PDSCH resource is scheduled using the downlink assignment, the terminal device can set receiving beamforming for receiving the PDSCH. In this situation, the terminal device can obtain information associated with the receiving beamforming from the DCI recorded with the downlink assignment. For example, the terminal device can obtain a transmission configuration indication (TCI) from the DCI. The TCI indicates the information associated with the QCL of the antenna port of the transmitted PDSCH. The terminal device can set receiving beamforming for receiving PDSCH (or the DMRS associated with PDSCH) by reading TCI. For example, when the DMRS associated with the SSB and the PDSCH in the TCI is set as the QCL in relation to the receiving parameter, the terminal device may use the receiving beam to receive the PDSCH, wherein the receiving beam is used in receiving the index SSB of the feedback to the base station device. It is noted that when the DCI cannot be obtained before the terminal device starts receiving the PDSCH (before the frame including the PDSCH is received by the terminal device) (the value of the scheduling offset indicating the time difference between the scheduling information and the PDSCH is less than a predetermined value), the terminal device can receive the PDSCH according to the TCI-default as in the default setting. It is noted that TCI-default is one of eight TCIs that are set. Furthermore, when the terminal device can receive the PDCCH, the terminal device can set the receiving beamforming based on the setting of the TCI-default.

Furthermore, to determine a preferable transmission beam of the base station device, a codebook that defines candidates of a predetermined precoding (beamforming) matrix (vector) is used. The base station device transmits the CSI-RS, and the terminal device obtains a suitable precoding (beamforming) matrix from the codebook and reports it to the base station device as PMI. Thereby, the base station device may know the transmitting beam direction suitable for the terminal device. It is noted that the codebook includes a precoding (beamforming) matrix for combining antenna ports and a precoding (beamforming) matrix for selecting antenna ports. When using the codebook for selecting antenna ports, the base station device may use a different transmitting beam directions for each antenna port. Therefore, if the terminal device reports a preferable antenna port as the PMI, the base station device may know the preferable transmitting beam direction. It is noted that the preferable receiving beam of the terminal device may be of the receiving beam direction associated with the CRI, or the preferable receiving beam direction may be determined again. When using the codebook for selecting an antenna port and the preferable receiving beam direction of the terminal device is the receiving beam direction associated with the CRI, the receiving beam direction for receiving the CSI-RS is ideally received in the receiving beam direction associated with the CRI. It is note that even when using the receiving beam direction associated with the CRI, the terminal device may also associate the PMI with the receiving beam direction. Furthermore, when using the codebook for selecting an antenna port, each antenna port may be transmitted from different base station devices (cells). In this situation, if the terminal device reports the PMI, the base station device may know which base station device (cell) is of a good communication quality. It is noted that, in this situation, the antenna ports of different base station devices (cells) may be set to be not QCLs.

As described above, the base station device and the terminal device according to the present disclosure may transmit and receive signals using a plurality of antenna panels. That is, the base station device and the terminal device may select whether to transmit a predetermined signal using the same spatial domain transmission filter or to transmit using a different spatial domain transmission filter. Similarly, the base station device and the terminal device may select whether to receive a predetermined signal using the same spatial domain reception filter or to transmit using a different spatial domain reception filter. The antenna panels can be changed by changing the spatial domain transmission filters (reception filters), however, it is not necessary to change the antenna panels.

When the terminal device according to the present disclosure transmits a predetermined signal under a predetermined condition, it may be set to either transmit using the same spatial domain transmission filter or transmit using a different spatial domain transmission filter.

The base station device according to the present disclosure may notify the terminal device of the SRS setting information related to the SRS transmitted by the terminal device. The base station device according to the present disclosure may include the setting information associated with the spatial domain transmission filter in the SRS setting information. The base station device and the terminal device may set information for identifying the spatial domain transmission filter (and the spatial domain reception filter). Thereby, the base station device and the terminal device may distinguish between the first spatial domain transmission filter and the second spatial domain transmission filter, for example. Ideally, the first spatial domain transmission filter and the second spatial domain transmission filter implement filtering of different characteristics, however, it is not necessarily limited thereto.

The information for identifying the spatial domain transmission filter (spatial domain reception filter) may be an identification number (ID). Furthermore, the information for identifying the spatial domain transmission filter (spatial domain reception filter) may be the scrambling setting information when the base station device notifies the terminal device of the information. Furthermore, the information for identifying the spatial domain transmission filter (spatial domain reception filter) may be the resource position of the configuration control information used when the base station device notifies the terminal device of the information.

In order to identify a spatial domain transmission filter (spatial domain reception filter), the base station device may set a reference spatial domain reception filter (first spatial domain reception filter, default spatial reception filter) for the terminal device. The first spatial domain reception filter may be a spatial domain reception filter in which the terminal device has received the SS/PBCH signal. Furthermore, the first spatial domain reception filter may be a spatial domain reception filter used in TCI Default. The first spatial domain reception filter may be set, for example, with the 0th TCI-State of the M number of TCI-States, or may be set with a predetermined non-zero TCI-State. Furthermore, the first spatial domain reception filter may be set to a predetermined QCL-Type for a predetermined signal (for example, set to QCL-TypeD for CSI-RS). The base station device may set a second spatial domain reception filter different from the first spatial domain reception filter for the terminal device. The base station device may set the terminal device to use either the first spatial domain reception filter or the second spatial domain reception filter for the terminal device. Similarly, the base station device may set the first spatial domain transmission filter for the terminal device. The first spatial domain transmission filter may be a spatial domain transmission filter used when the terminal device transmits a signal including information indicating the index of the SS/PBCH signal to the base station device.

The first spatial domain transmission filter and the first spatial domain reception filter may be set with beam correspondence. Furthermore, the second spatial domain transmission filter and the second spatial domain reception filter can be set with beam correspondence. The beam correspondence as described may be determined by a frequency band in which the terminal device (and the base station device) transmits a signal. For example, when the terminal device transmits (or receives) a signal between a first frequency band that is less than 6 GHz and a second frequency band that is greater than 27 GHz, for the second frequency band being a high frequency band, the first spatial domain transmission filter and the first spatial domain reception filter may be set with beam correspondence.

The base station device according to the present disclosure may include information for identifying a spatial domain transmission filter in the SRS setting information. The terminal device may set a spatial domain transmission filter for transmitting an SRS associated with the SRS setting information based on information for identifying the spatial domain transmission filter included in the SRS setting information.

The base station device according to the present disclosure may include information for identifying the spatial domain transmission filter associated with the SRS in the triggering signal for instructing the terminal device to transmit the SRS. The triggering may be DCI. The base station device may include information for identifying the spatial domain transmission filter in the DCI.

The terminal device according to the present disclosure may, when transmitting an SRS, transmit the SRS in a resource orthogonal to the SRS transmitted by other terminal devices. The terminal device may generate the SRS as a signal having a comb spectrum, and transmit the SRS at a frequency start position different from that of the SRS transmitted by other terminal devices. Furthermore, the terminal device may spread and transmit the SRS with an orthogonal cover code (OCC) different from other terminal devices. The orthogonal resources provided for the terminal device to transmit the SRS may be set with the base station device. When setting the orthogonal resources for transmitting the SRS to the terminal device, the base station device may set information associated with the spatial domain transmission filter for each orthogonal resource. For example, when the base station device notifies the terminal device of the OCC for spreading the SRS with bit information, each bit information further includes information indicating a spatial domain transmission filter. For example, when there are four OCC patterns for spreading the SRS, the base station device may notify the terminal device which OCC to use with the 2-bit bit information. However, in this situation, for example, when the bit information indicates "00," the spatial domain transmission filter is "0," and when the bit information indicates "01," the spatial domain transmission filter is set based on the method of the spatial domain transmission filter being "1." The same is applicable when the terminal device orthogonalizes the SRS in the frequency domain or when the terminal device orthogonalizes the SRS by phase rotation.

The terminal device may transmit a plurality of SRSs in the same OFDM symbol. In this situation, when transmitting a plurality of SRSs, the terminal device may also transmit with the same spatial domain transmission filter or with different spatial domain transmission filters. When instructing a terminal device to simultaneously transmit a plurality of SRSs, the base station device may set the same spatial domain transmission filter, or different spatial domain transmission filters for transmission.

The base station device may set SRS spatial correspondence to the terminal device. The signal for setting the SRS spatial correspondence may be, for example, an SS/PBCH signal, an NZP CSI-RS, a periodic SRS, a PDCCH signal, a PDSCH signal, and a DMRS. For example, when setting the SRS to be spatial correspondence with the SS/PBCH signal, the terminal device may use the spatial domain reception filter that is used in receiving the SS/PBCH signal as a spatial domain transmission filter for transmitting the SRS. The base station device may set information for identifying a spatial domain reception filter for a signal (for example, an SS/PBCH signal, an NZP CSI-RS, a periodically transmitted SRS) related to spatial correspondence with the SRS. For example, the base station device may notify the terminal device of CSI-RS setting information as the setting information related to the CSI-RS. However, in this situation, the base station device may include information for identifying the spatial domain reception filter that receives the CSI-RS in the CSI-RS setting information. The base station may set the spatial domain transmission filter for transmitting the SRS by the terminal device by appropriately setting the CSI-RS that spatially corresponds to the SRS.

When the terminal device notifies the base station device of the index of the SS/PBCH signal and the information indicating the resource of the NZP CSI-RS, the terminal device may notify whether the spatial domain reception filter when the SS/PBCH signal and the NZP CSI-RS is received is the first spatial domain reception filter or the second spatial domain reception filter. The terminal device may notify the base station device whether the spatial domain reception filter when receiving the signal is the first spatial domain reception filter.

The base station device may set SRS transmission using a different spatial domain transmission filter to the terminal device that sets periodic SRS transmission. For example, the base station device may set the terminal device to switch the spatial domain transmission filter every time a periodic SRS is transmitted. For example, the base station device may set the terminal device according to the following: n is set to a natural number, the $2(n-1)^{th}$ SRS transmitted by the terminal device is set to the first spatial domain transmission filter, and the $2n-1^{th}$ SRS transmitted by the terminal device is set to transmit with the second spatial domain transmission filter.

The base station device may set the terminal device settings to simultaneously receive signals that spatial correspondence with the SRS using a plurality of spatial domain reception filters. For example, the base station device may include, in the CSI-RS setting information, information indicating whether to perform simultaneous reception using a plurality of spatial domain reception filters. The plurality of spatial domain reception filters include a first spatial domain reception filter. When the terminal device feeds back feedback information calculated based on the CSI-RS received by different spatial domain reception filters to the base station device, information indicating any one of the spatial domain reception filters used for reception of the CSI-RS is included in the feedback information. The terminal device may include, in the feedback information, information indicating whether the spatial domain reception filter used for receiving the CSI-RS is the first spatial domain reception filter.

The methods disclosed herein may be used in associating between frequencies. For example, information provided for the base station device and the terminal device to identify the spatial domain transmission filter and the spatial domain reception filter may be common between CCs or between BWPs. For example, in an initial connection of BWP to a base station device, the terminal device may use the identification performed for a spatial domain reception filter set in the terminal device in another BWP. Furthermore, the base station device may notify the terminal device of information indicating whether to permit or prohibit the identification of the common spatial domain reception filter in a plurality of BWPs.

The method disclosed herein allows the terminal device to apply different spatial domain transmission filters to a plurality of SRSs. This operation may be performed according to the number of orders that the terminal device may transmit.

2. Common Features for All Implementations

The programs operated in the devices of the present disclosure may be implemented by controlling a Central Processor Unit (CPU) and causing a computer to realize the program functions of the present disclosure. The program or the information being processed by the program may be stored in volatile memory (e.g., random access memory (RAM)), a hard disk drive (HDD), non-volatile memory (e.g., flash memory), or any other suitable memory system.

It is noted that the program that realizes functions of each implementation in the present disclosure may be stored on a computer-readable medium. Computer systems through reading the programs stored in the storage medium executes the programs to realize the corresponding functions. The "computer system" disclosed herein may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Furthermore, various characteristics or function modules used in the equipment disclosed in the implementations herein may be installed or implemented by electronics or circuits such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

It is noted that, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, other home appliances, terminal devices or communications devices.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

INDUSTRIAL APPLICABILITY

The present disclosure is suitable for a base station device, a terminal device, and a communication method.

What is claimed is:

1. A terminal device that communicates with a base station device, the terminal device comprising:
   a receiver for receiving sounding reference signal (SRS) setting information and setting information for signals, the signals having a spatial correlation that is set to at least one SRS; and
   a transmitter for transmitting the at least one SRS, wherein:
   the SRS setting information includes information indicating the spatial correlation with the at least one SRS;
   the transmitter, when transmitting the at least one SRS, sets a first spatial domain transmission filter and a second spatial domain transmission filter;
   a first spatial domain reception filter and the first spatial domain transmission filter are set with beam correspondence;
   a second spatial domain reception filter and the second spatial domain transmission filter are set with beam correspondence;
   the setting information for the signals having the spatial correlation set to the at least one SRS includes information identifying the first spatial domain reception filter and the second spatial domain reception filter; and
   the transmitter transmits the at least one SRS using at least one of the first spatial domain transmission filter and the second spatial domain transmission filter based on the information indicating the spatial correlation with the at least one SRS and the signals having the spatial correlation set to the at least one SRS.

2. The terminal device according to claim 1, wherein the first spatial domain reception filter is associated with a predetermined transmission configuration indication (TCI)-State.

3. The terminal device according to claim 1, wherein the information identifying the first spatial domain reception filter and the second spatial domain reception filter is set in a predetermined frequency band.

4. The terminal device according to claim 1, wherein the SRS setting information includes the information identifying the first spatial domain reception filter and the second spatial domain reception filter.

5. The terminal device according to claim 1, wherein each of the signals having the spatial correlation set to the at least one SRS comprises a synchronization signal (SS) Physical Broadcast Channel (PBCH) signal, and
a filter that is set when receiving each SS/PBCH signal is set as the first spatial domain reception filter.

6. A communication method for a terminal device communicating with a base station device, the communication method comprising:
receiving sounding reference signal (SRS) setting information and setting information for signals, the signals having a spatial correlation that is set to at least one SRS; and
transmitting the at least one SRS, wherein:
the SRS setting information includes information indicating the spatial correlation with the at least one SRS;
when transmitting the at least one SRS, a first spatial domain transmission filter and a second spatial domain transmission filter are set;
a first spatial domain reception filter and the first spatial domain transmission filter are set with beam correspondence;
a second spatial domain reception filter and the second spatial domain transmission filter are set with beam correspondence;
the setting information for the signals having the spatial correlation set to the at least one SRS includes information identifying the first spatial domain reception filter and the second spatial domain reception filter; and
the at least one SRS is transmitted using at least one of the first spatial domain transmission filter and the second spatial domain transmission filter based on the information indicating the spatial correlation with the at least one SRS and the signals having the spatial correlation set to the at least one SRS.

7. The communication method according to claim 6, wherein the first spatial domain reception filter is associated with a predetermined transmission configuration indication (TCI)-State.

8. The communication method according to claim 6, wherein the information identifying the first spatial domain reception filter and the second spatial domain reception filter is set in a predetermined frequency band.

9. The communication method according to claim 6, wherein the SRS setting information includes the information identifying the first spatial domain reception filter and the second spatial domain reception filter.

10. The communication method according to claim 6, wherein:
each of the signals having the spatial correlation set to the at least one SRS comprises a synchronization signal (SS)/Physical Broadcast Channel (PBCH) signal, and
a filter that is set when receiving each SS/PBCH signal is set as the first spatial domain reception filter.

* * * * *